(12) United States Patent
Sawada et al.

(10) Patent No.: US 7,088,683 B2
(45) Date of Patent: Aug. 8, 2006

(54) COMMUNICATION SYSTEM AND DEVICE UNDER OFDM SYSTEM

(75) Inventors: Manabu Sawada, Yokohama (JP); Masahiro Kuwabara, Yokosuka (JP)

(73) Assignee: DENSO Corporation, Kariya (JP)

( * ) Notice: Subject to any disclaimer, the term of this patent is extended or adjusted under 35 U.S.C. 154(b) by 743 days.

(21) Appl. No.: 09/885,729

(22) Filed: Jun. 19, 2001

(65) Prior Publication Data

US 2001/0055287 A1  Dec. 27, 2001

(30) Foreign Application Priority Data

Jun. 27, 2000  (JP) .............................. 2000-193146

(51) Int. Cl.
*H04J 1/16* (2006.01)
*H04B 7/208* (2006.01)

(52) U.S. Cl. ...................... 370/252; 370/344; 370/468; 455/67.11; 455/68; 455/45

(58) Field of Classification Search ................ 370/203, 370/208, 210, 252, 319, 343, 344; 455/45
See application file for complete search history.

(56) References Cited

U.S. PATENT DOCUMENTS

| 6,198,781 B1 | 3/2001 | Ohno et al. | |
| 6,400,325 B1* | 6/2002 | Aaltonen | 343/711 |
| 6,456,827 B1* | 9/2002 | Kubo et al. | 455/68 |
| 6,542,471 B1* | 4/2003 | Ito | 370/252 |
| 6,618,596 B1* | 9/2003 | Uchida | 455/522 |
| 6,816,452 B1 | 11/2004 | Maehata | |
| 6,870,826 B1* | 3/2005 | Ishizu | 370/343 |

FOREIGN PATENT DOCUMENTS

| JP | 10-173625 | 12/1996 |
| JP | 11-163823 | 11/1997 |
| JP | 2000-115119 | 9/1998 |
| JP | 2000-151548 | 11/1998 |
| JP | A-11-103425 | 4/1999 |
| JP | 11-308153 | 11/1999 |

* cited by examiner

*Primary Examiner*—Huy D. Vu
*Assistant Examiner*—Nittaya Juntima
(74) *Attorney, Agent, or Firm*—Harness, Dickey & Pierce, PLC

(57) ABSTRACT

Communication between a stationary terminal such as an on-road terminal and a mobile terminal mounted on an automotive vehicle is performed under an OFDM system. Before transmitting data signals from the mobile terminal to the stationary terminal, a control signal indicating the number of sub-carries used in the data transmission is sent to the stationary terminal. The number of sub-carriers is decreased in accordance with increase of the moving speed to avoid deterioration in communication quality due to the moving speed increase. A modification formula and/or an error-correction-code coding rate used in the data transmission may be varied according to the moving speed in place of or together with varying the number of sub-carriers.

12 Claims, 22 Drawing Sheets

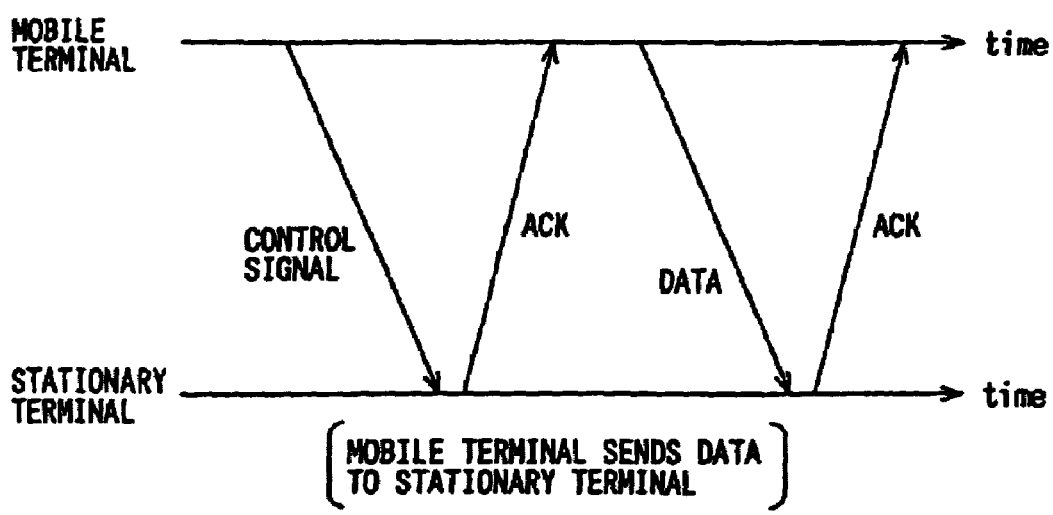

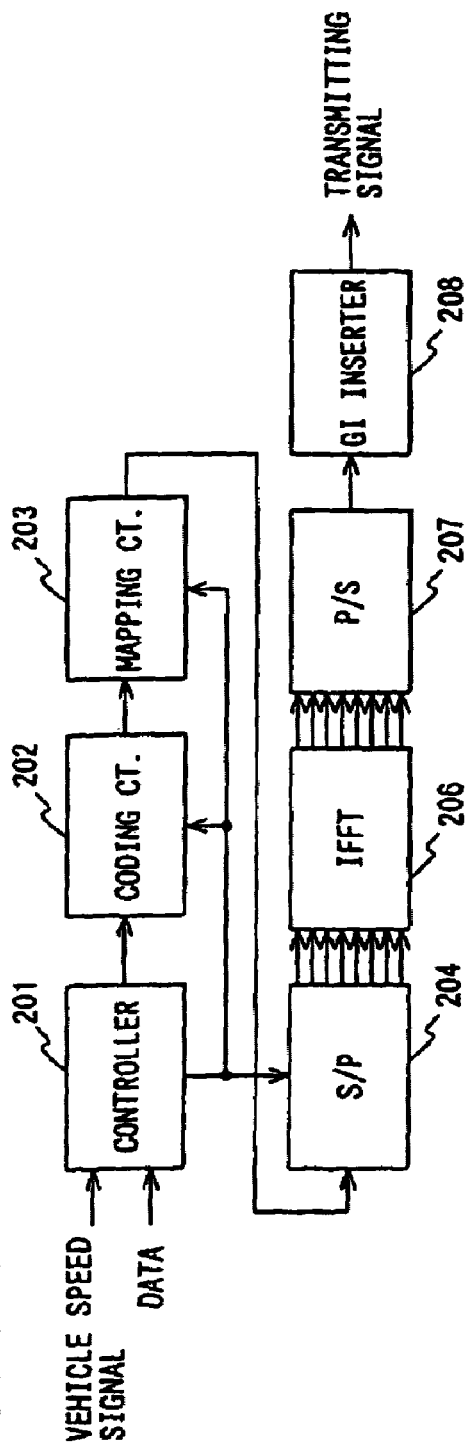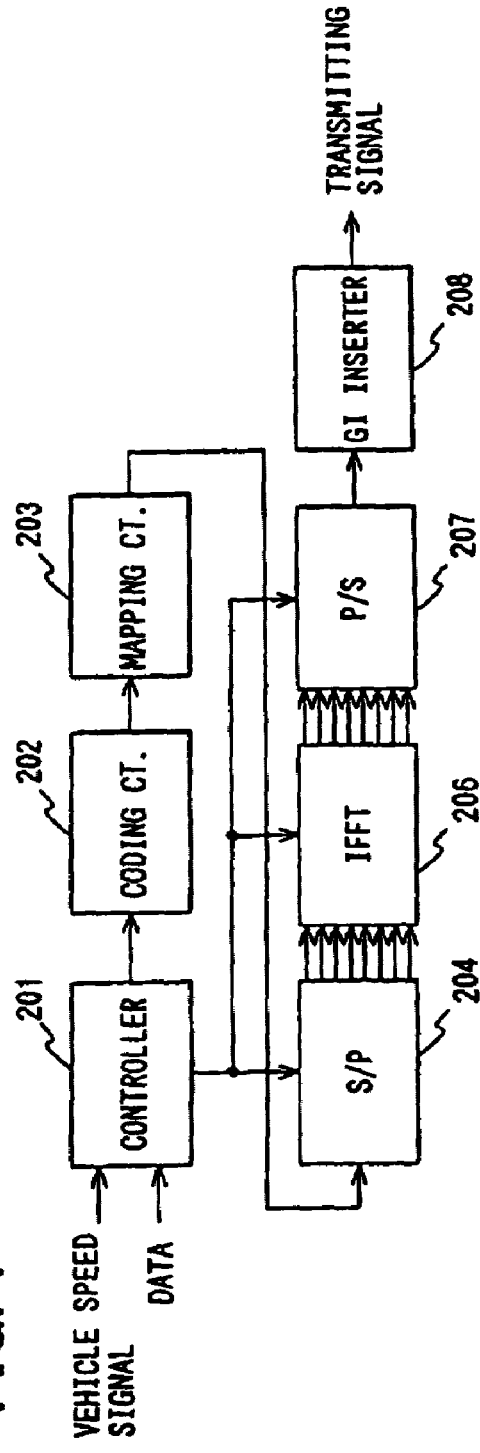

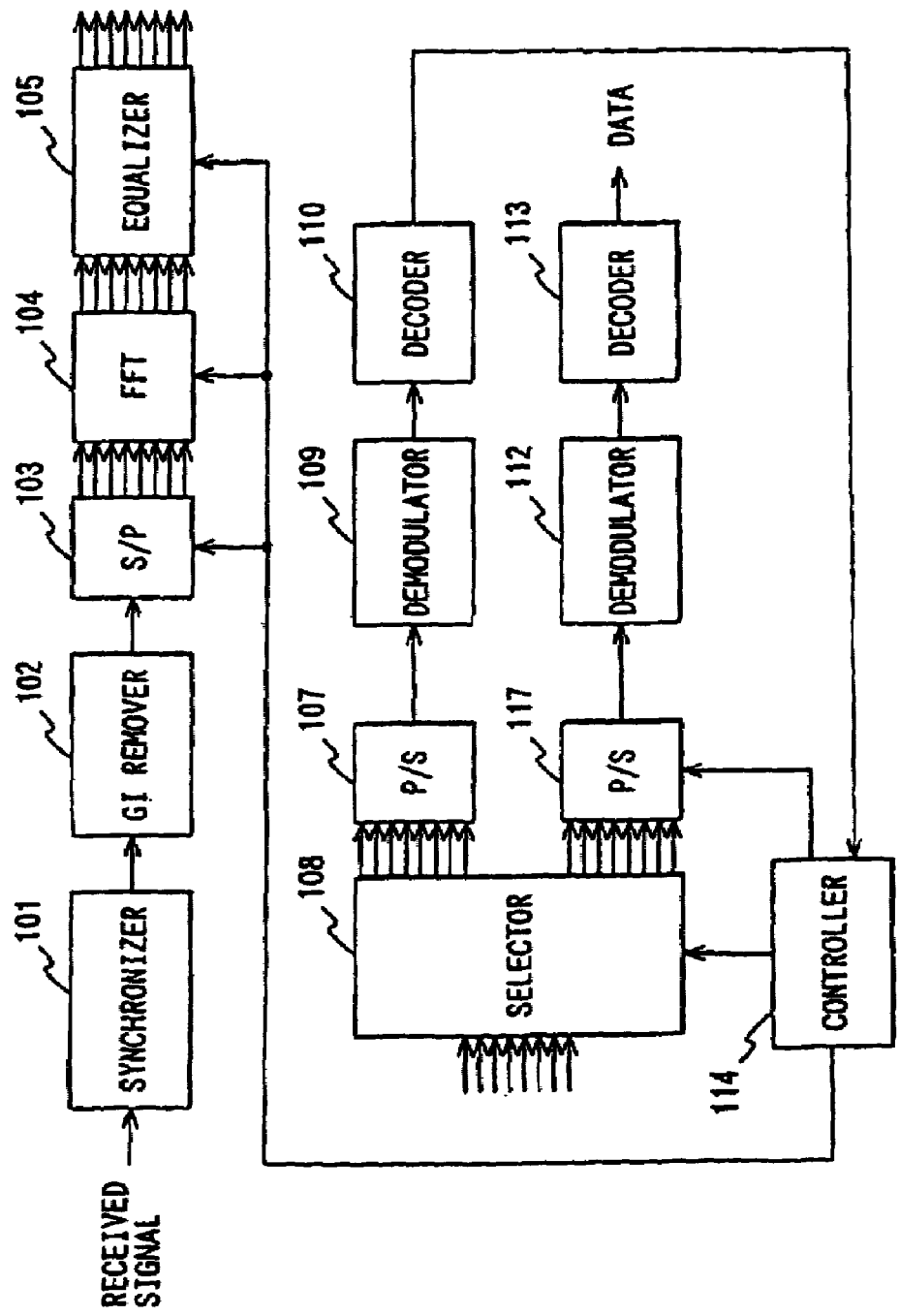

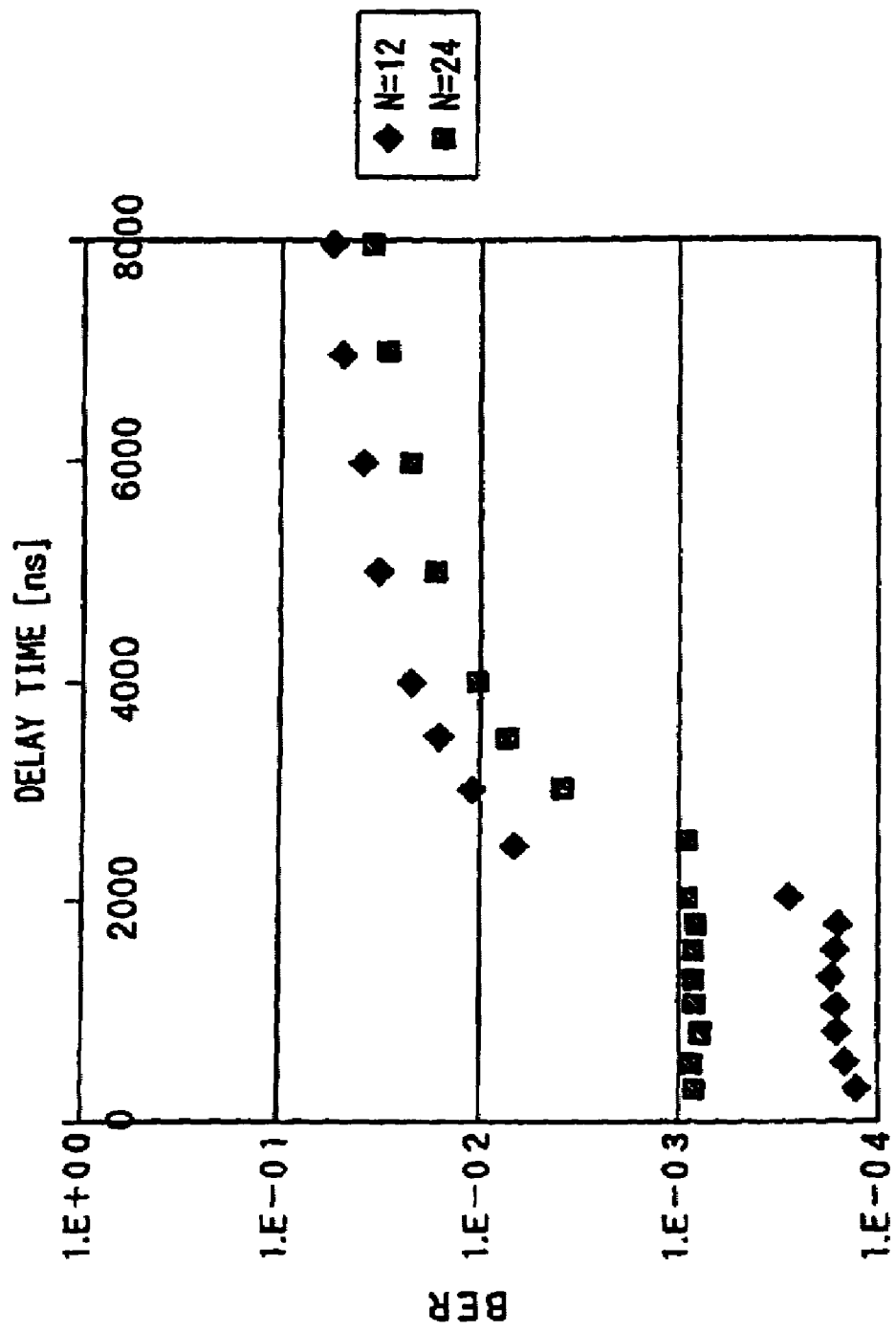

FIG. 11

| VEHICLE SPEED V | MODULATION FORMULA |
|---|---|
| Vl | 16QAM |
| Vm | QPSK |
| Vh | BPSk |

| VEHICLE SPEED V | CODING RATE |
|---|---|
| Vl | R=3/4 |
| Vm | R=9/16 |
| Vh | R=1/2 |

Vl < Vm < Vh

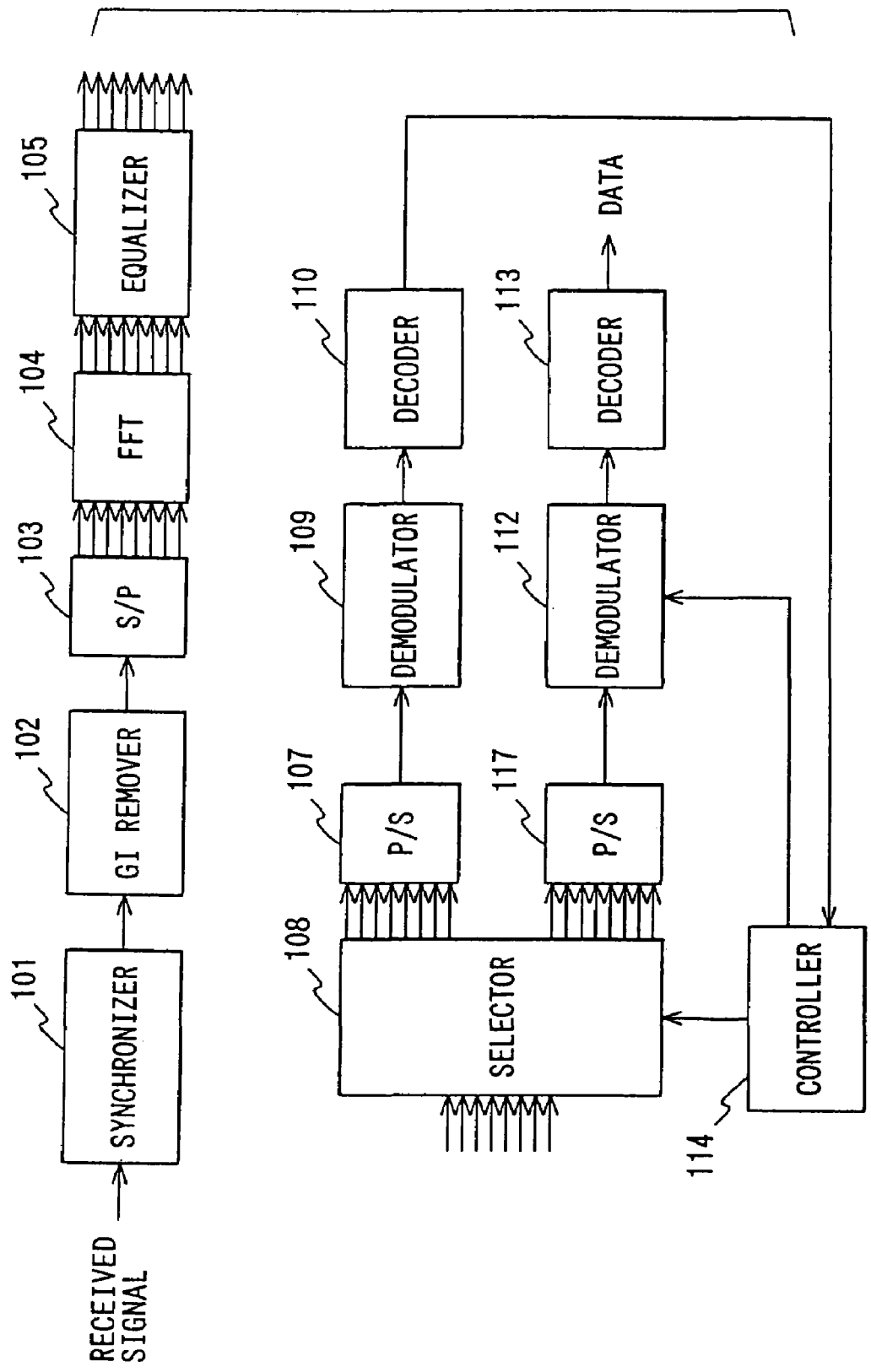

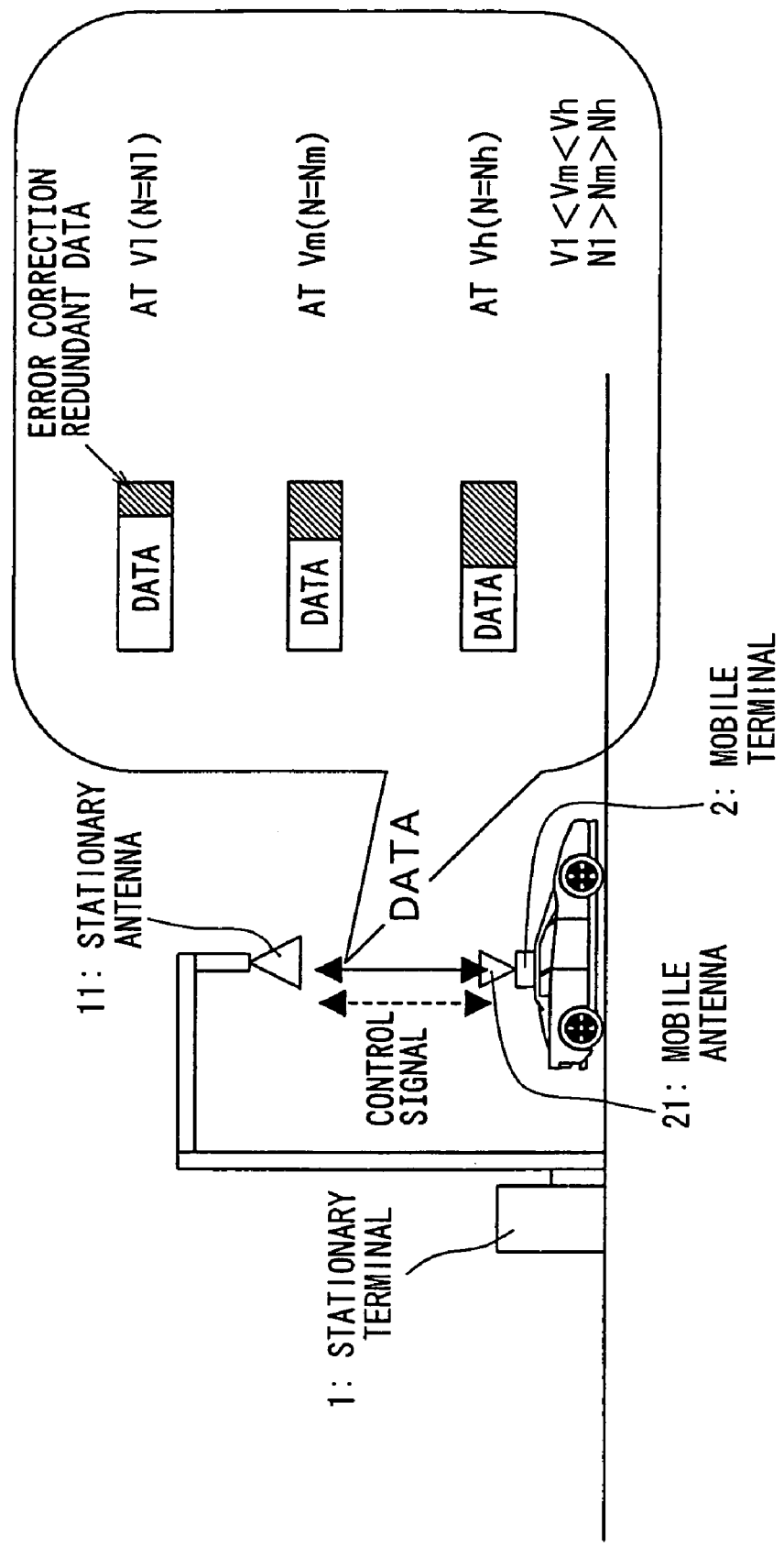

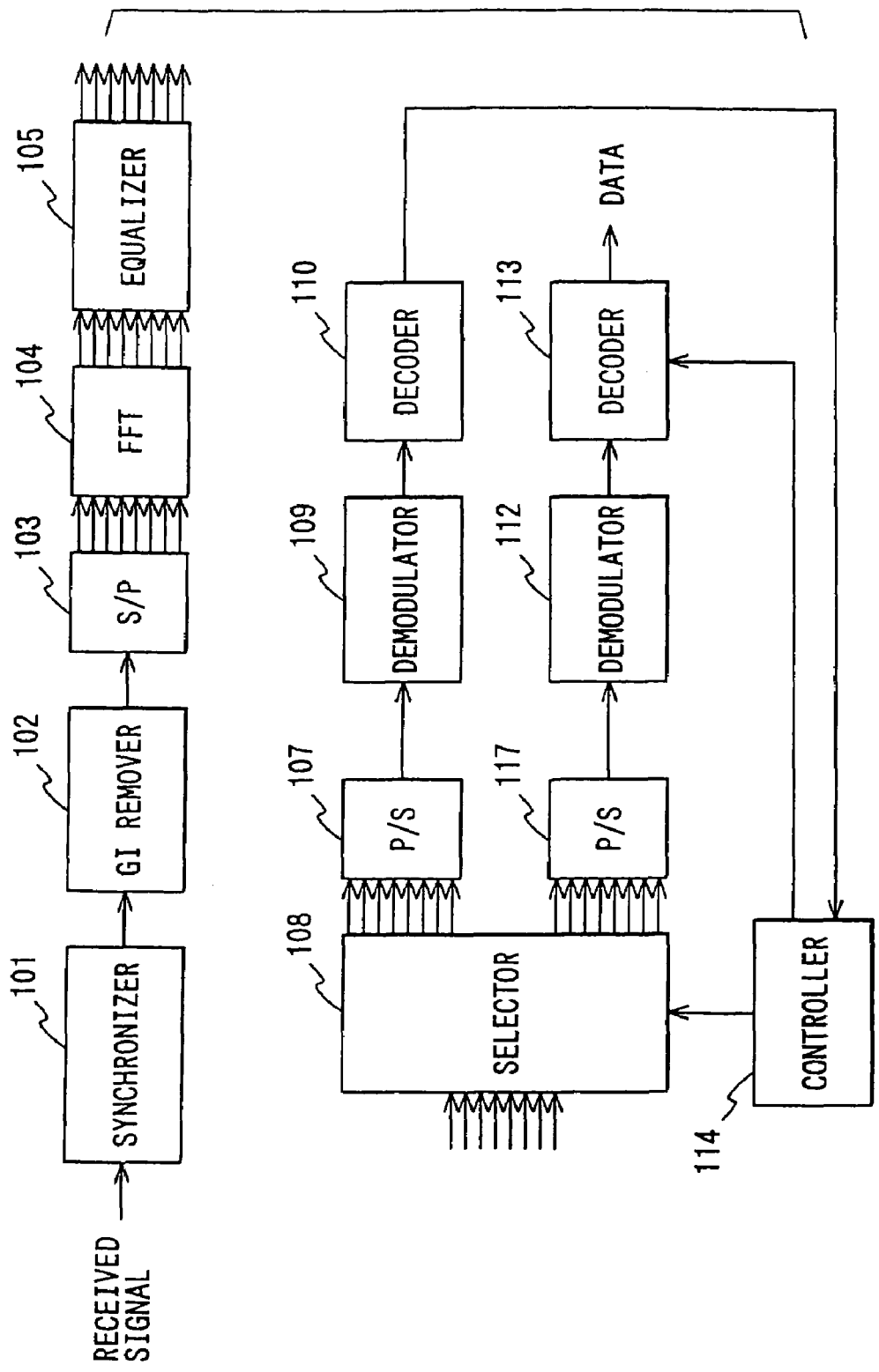

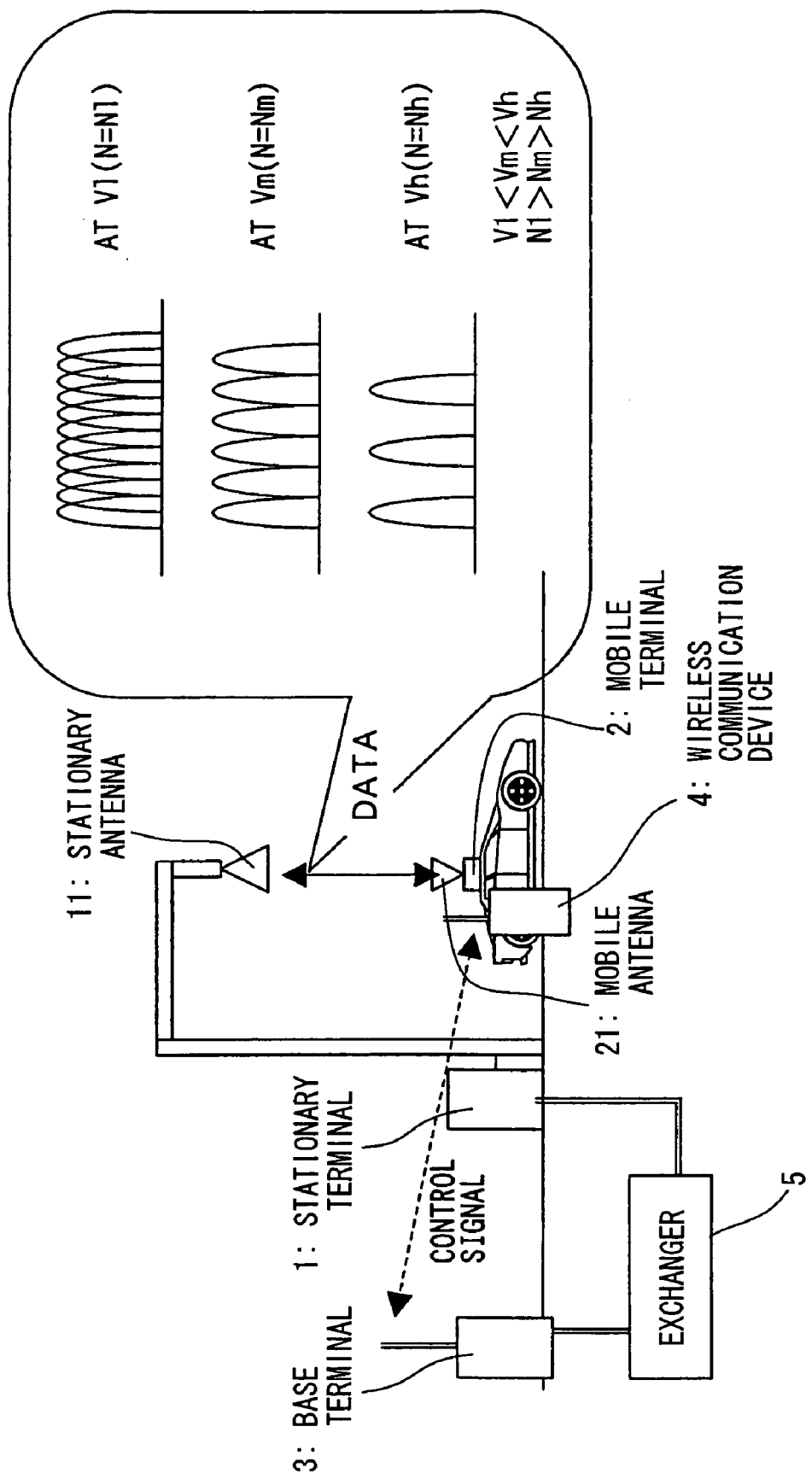

64 CARRIERS

32 CARRIERS

16 CARRIERS

8 CARRIERS

COMMUNICATION SYSTEM AND DEVICE UNDER OFDM SYSTEM

CROSS-REFERENCE TO RELATED APPLICATION

This application is based upon and claims benefit of priority of Japanese Patent Application No. 2000-193146 filed on Jun. 27, 2000, the content of which is incorporated herein by reference.

BACKGROUND OF THE INVENTION

1. Field of the Invention

The present invention relates to a wireless communication system between a stationary terminal and a mobile terminal under the OFDM (orthogonal frequency division multiplexing) system, and further relates to a communication device used in that system.

2. Description of Related Art

A DSRC (dedicated short-range communication) system between a stationary terminal and a mobile terminal under the OFDM system is being developed. In this system, a Doppler shift occurs in signals transmitted from the mobile terminal when the mobile terminal moves at a high speed. If the Doppler shift occurs, frequencies received by a receiver shift from frequencies transmitted from a sender because carries are mapped in the frequency axis in the OFDM system. An amount of the frequency shift depends on a speed of the mobile terminal, i.e., the higher the speed, the larger the shift. Communication quality is much damaged by carrier-mixing with a neighboring carrier if a large shift occurs.

SUMMARY OF THE INVENTION

The present invention has been made in view of the above-mentioned problem, and an object of the present invention is to provide an improved OFDM communication system, in which a high communication quality is kept even if a mobile terminal moves at a high speed. Another object of the present invention is to provide a communication device that is suitable to the improved system.

In an OFDM communication system between a stationary terminal such as an on-road terminal and a moving terminal mounted on an automobile vehicle, the number of sub-carriers to be used in transmitting DATA signals from the mobile terminal is determined according to a moving speed of the vehicle. A smaller number of the sub-carriers is used as the moving speed becomes higher to avoid adverse effects of a Doppler shift. A control signal including the number of sub-carriers is sent from the mobile terminal to the stationary terminal before the DATA signals are transmitted. The DATA signals transmitted from the mobile terminal to the stationary terminal are decoded at the stationary terminal based on the notified number of sub-carriers. A DATA transmission rate may be also varied according to the moving speed of the mobile terminal. The DATA signals may be transmitted from the stationary terminal to the mobile terminal in the similar manner.

Alternatively, a modulation formula having a higher error-robustness and/or a error-correction-code coding rate having a higher error-correction ability may be used in transmitting the DATA signals in accordance with increase of the moving speed of the mobile terminal. The transmission rate may be varied according to the moving speed of the mobile terminal in this case, too. A wireless communication device for transmitting the control signal may be additionally used together with a transmitter-receiver of the mobile terminal. In this case, the control signal is sent to a base terminal that communicates with the stationary terminal.

Preferably, the information to be included in the control signal such as the number of sub-carriers is determined according to the moving speed detected by a speed sensor mounted on the moving terminal. Alternatively, the stationary terminal may include a detector for detecting the moving speed of the mobile terminal, or the stationary terminal may estimate the number of sub-carriers used in the DATA transmission based on the received DATA signals. In this case, it is not necessary to send the control signal from the mobile terminal to the stationary terminal before the DATA transmission.

According to the present invention, deterioration in communication quality due to the moving speed increase is avoided because DATA signals are transmitted based on a communication method determined according to the moving speed.

Other objects and features of the present invention will become more readily apparent from a better understanding of the preferred embodiments described below with reference to the following drawings.

BRIEF DESCRIPTION OF THE DRAWINGS

FIG. 2 is a table showing the number of sub-carriers determined according to a vehicle speed;

FIG. 3 is a diagram showing communication timing between stationary and mobile terminals;

FIG. 4 is a block diagram showing a structure of a transmitter in a mobile terminal used in the first embodiment;

FIG. 7 is a block diagram showing a structure of a transmitter in a mobile terminal used in the second embodiment;

FIG. 8 is a block diagram showing a structure of a receiver in a stationary terminal used in the second embodiment;

FIG. 9 is a graph showing a bit error rate relative to a delay time, obtained in a simulation at a vehicle speed of 180 km/h;

FIG. 11 is a table showing modulation formulae used at respective vehicle speeds;

FIG. 13 is a block diagram showing a structure of a receiver in a stationary terminal used in the third embodiment;

FIG. 14 is a conceptual diagram showing communication between stationary and mobile terminals in a fourth embodiment of the present invention;

FIG. 15 is a table showing coding rates of an error-correction-code selected according to vehicle speeds;

FIG. 17 is a block diagram showing a structure of a receiver in a stationary terminal used in the fourth embodiment;

FIG. 18 is a conceptual diagram showing communication between stationary and mobile terminals in a fifth embodiment of the present invention;

DETAILED DESCRIPTION OF THE PREFERRED EMBODIMENTS

First Embodiment

Figure 1:
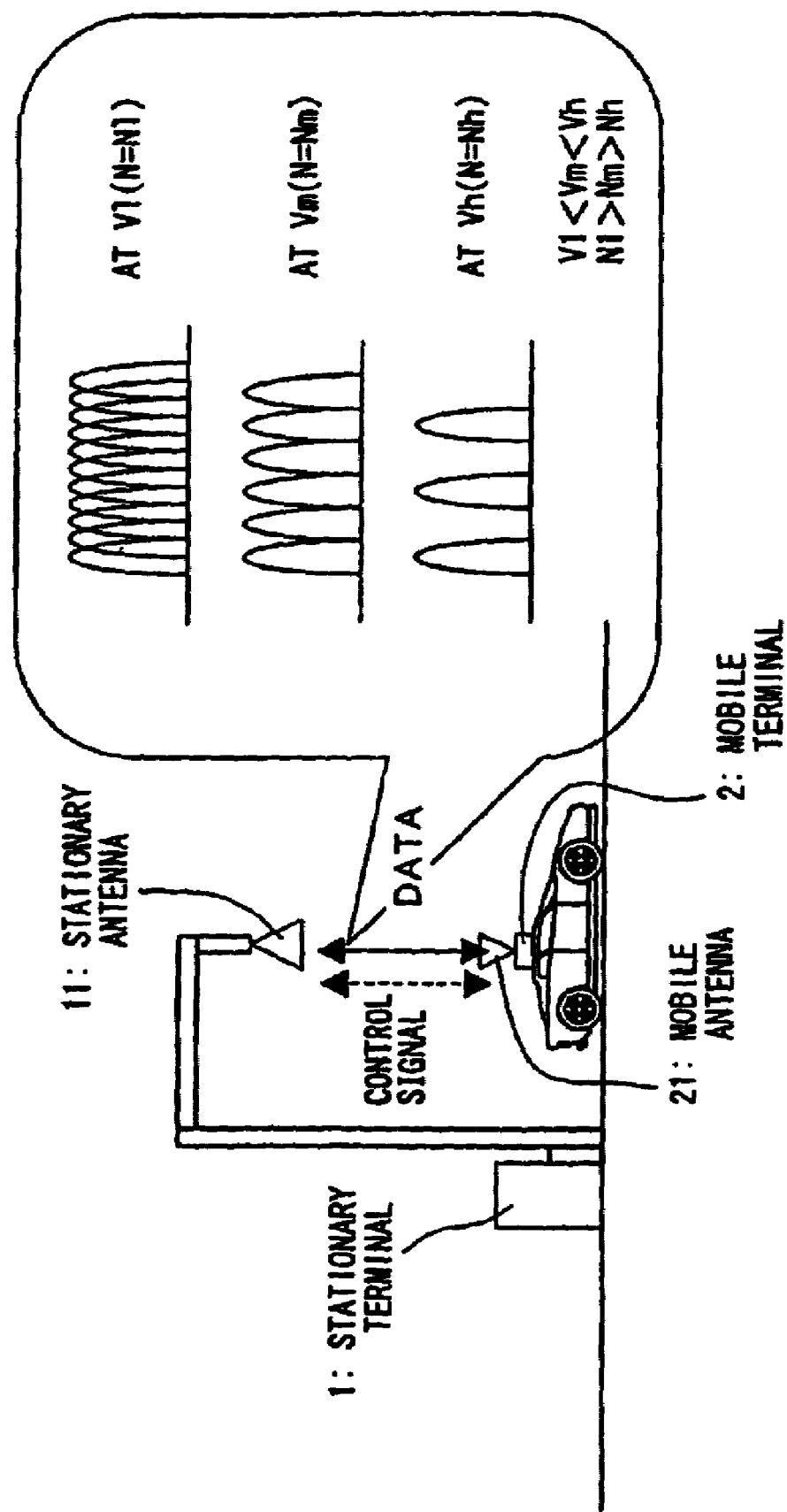
FIG. 1 is a conceptual diagram showing communication between a stationary terminal and a mobile terminal in a first embodiment of the present invention.

A first embodiment of the present invention will be described with reference to FIGS. 1–5. FIG. 1 shows communication between a stationary terminal 1 positioned on a road and a mobile terminal 2 mounted on an automotive vehicle. The stationary terminal 1 includes a stationary antenna 11, and the mobile terminal 2 includes a mobile antenna 21. The mobile terminal 2 determines the number of sub-carriers to be used in the OFDM communication according to its driving speed.

FIG. 2 shows the number of the sub-carriers corresponding to respective vehicle speeds. A vehicle speed Vl means a low speed from zero to a first predetermined speed, a vehicle speed Vm means a medium speed from the first predetermined speed to a second predetermined speed, and a vehicle speed Vh means a high speed exceeding the second predetermined speed (Vl<Vm<Vh). Those vehicle speeds are detected by a speed sensor mounted on the vehicle. A high number of sub-carriers Nl is used at the vehicle speed Vl, a medium number of sub-carries Nm is used at the vehicle speed Vm, and a low number of sub-carriers Nh is used at the vehicle speed Vh (Nl>Nm>Nh). In other words, the number of the sub-carriers is set so that it becomes lower as the vehicle speed becomes higher.

In this embodiment, the number N of sub-carriers is selected from numbers $2^n$, where n is an integer. A transmission rate Fn is set, so that it has the maximum rate Fn(max) when the number of sub-carriers N is the maximum Nmax. The transmission rate Fn is decreased to Fn(max)/2 when the number of sub-carries N becomes Nmax/2, and it is further decreased to Fn(max)/4 when the number of sub-carriers becomes Nmax/4. To decrease the number of sub-carries form Nmax to Nmax/2, one sub-carrier is deleted from every neighboring two sub-carriers. Similarly, to decrease it to Nmax/4, three sub-carriers are deleted from every neighboring four sub-carriers.

FIG. 3 shows timing for performing the communication between the stationary and mobile terminals. First, the transmitter in the mobile terminal 2 sends a control signal to the stationary terminal 1. The control signal includes information regarding the number of sub-carriers N that is determined as above and the transmission rate Fn corresponding to the number of sub-carriers N. The stationary terminal 1 sends back an ACK signal acknowledging the receipt of the control signal to the mobile terminal 2. The control signal and the ACK signal are sent using the low number of sub-carriers, e.g., Nh, because an amount of information included therein is much lower than that of communication data. An error-correction-code coding rate R having the highest correction ability (e.g., R=½) is used in sending the control signal and the ACK signal. Also, a modulation formula having the highest robustness against noise (e.g., BPSK) is used. The coding rate R and the modulation formula to be used in transmitting the control signal and the ACK signal are predetermined between the stationary and mobile terminals.

Then, the mobile terminal 2 transmits a large amount of data (DATA) to the stationary terminal 1 using the number of sub-carriers N and the transmission rate Fn, both of which have been notified to the stationary terminal 1. The stationary terminal 1 sends back an ACK signal to the mobile terminal 2 when the stationary terminal 1 accurately received the DATA.

FIG. 4 shows a structure of a transmitter in the mobile terminal 2. The structure is similar to that of a conventional transmitter. Information to be transmitted is codified in a coding circuit 202, sub-carrier-modified in a mapping circuit 203, converted into a parallel signal in a serial-parallel converter 204, IFFT-processed in an IFFT-processor (inverse fast Fourier transform) 206, and converted into a serial signal in a parallel-serial converter 207. Finally, guard intervals are added to the serial signal in a guard interval inserter 208, and then, the signal is transmitted. A controller 201 determines the number of sub-carriers N, based on the table shown in FIG. 2 according to a present vehicle speed. The controller 201 feeds the control signal that includes the number of sub-carriers N and a corresponding transmission rate Fn to the coding circuit 202 and the mapping circuit 203 to transmit the control signal from the mobile terminal 2 to the stationary terminal 1. As mentioned above, the transmission of the control signal and the ACK signal is performed under the following conditions: the number of sub-carriers N is set to Nh, the error-correction-code coding rate R is set to ½, and the modulation formula BPSK is selected. The coding circuit 202 and the mapping circuit 203 are set to realize those conditions.

The controller 201 controls the coding circuit 202 and the serial-parallel converter 204, so that the DATA are transmitted under the determined number of sub-carriers N and the transmission rate Fn. The coding circuit 202 is structured to codify the DATA under either one of the transmission rates, Fn(max), Fn(max)/2 or Fn(max)/4. The transmission rate to be used is instructed by the controller 201. The serial-parallel converter 204 converts a serial signal into a parallel signal of 64 symbols when the number of sub-carriers is Nl, into a parallel signal of 32 symbols when the number of sub-carriers is Nm, and into a parallel signal of 16 symbols when the number of sub-carriers is Nh. In converting the DATA into the 32-symbol parallel signal, zero (0) is inserted between signals of the 64-symbol signal, and similarly another zero (0) is inserted to form the 16-symbol parallel signal. In this embodiment, the error-correction-code coding rate R is set to ¾ and a 16-QAM sub-carrier-modulation formula is used in transmitting the DATA.

Figure 5:
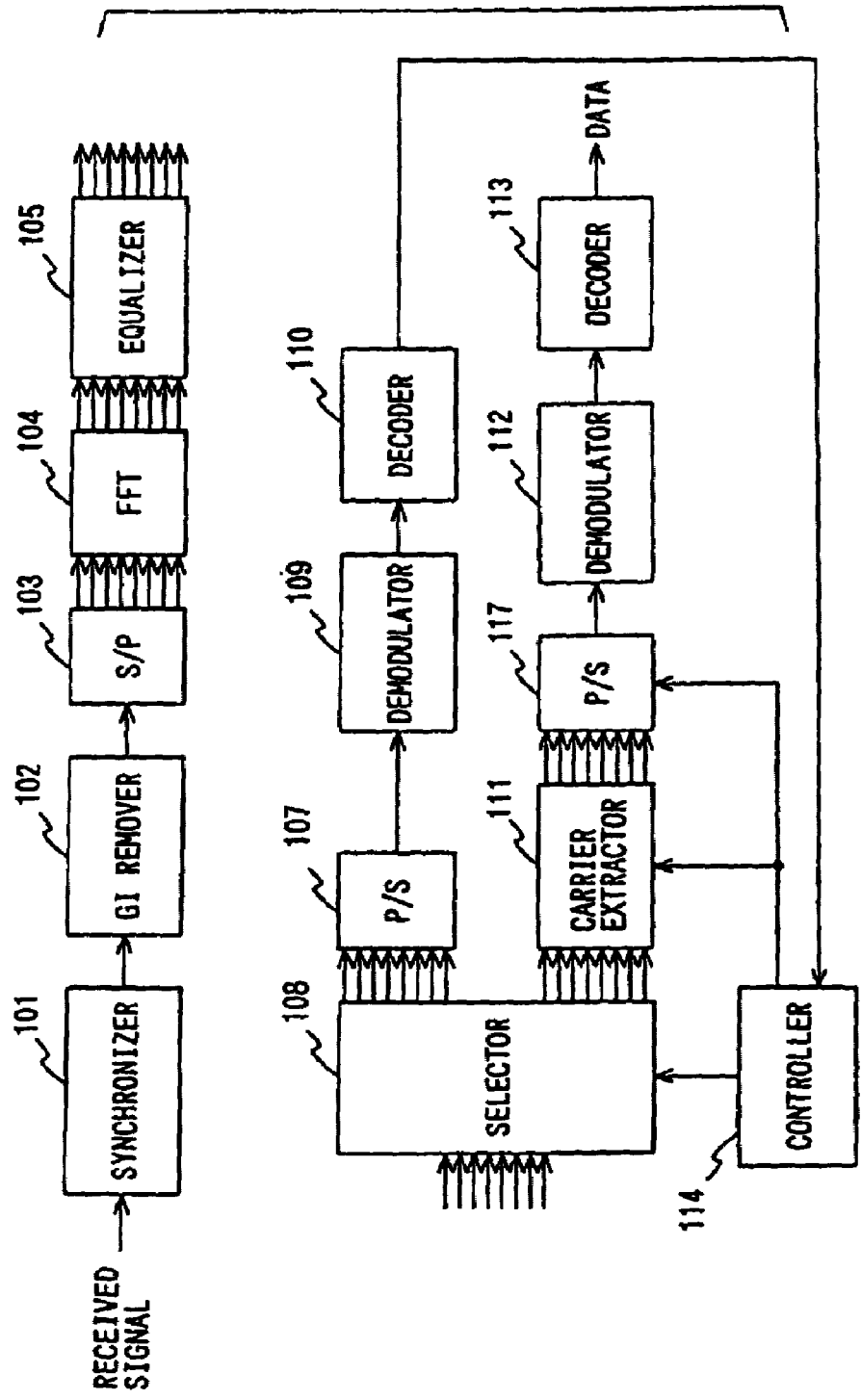
FIG. 5 is a block diagram showing a structure of a receiver in a stationary terminal used in the first embodiment.

FIG. 5 shows a structure of a receiver in the stationary terminal 1. The structure is similar to that of a conventional receiver. A received signal is synchronized with time and frequency in a synchronizer 101, the guard intervals are removed in a guard interval remover 102, the series signal is converted into a parallel signal in a serial-parallel converter 103, the parallel signal is FFT-processed in an FFT-processor 104 (fast Fourier transform), and the parallel signal is equalized in a equalizer 105. Then, the parallel signal is fed to a selector 108 that outputs the signal selectively either to a parallel-serial converter 107 or to a carrier extractor 111. A controller 114 controls the selector 108, so that the selector 108 outputs the signal to the parallel-serial converter 107 except when the stationary terminal 1 receives the DATA.

Accordingly, the control signal and the ACK signal are fed from the selector 108 to the parallel-serial converter 107. A demodulator 109 demodulates the serial signal fed from the parallel-serial converter 107 under the BPSK demodulation formula, and a decoder 110 decodes the demodulated signal under the error-correction-code coding rate ½. The controller 114 controls a transmitter (not shown) of the stationary terminal 1 to send the ACK signal to the mobile terminal 2 when the control signal is fed from the decoder 110 to the controller 114. Further, the controller 114 controls the selector 108 to switch its output to the carrier extractor 111 and controls the carrier extractor 111 to extract carriers under the number of sub-carriers notified from the mobile terminal 2.

When the DATA sent from the mobile terminal 2 are received by the stationary terminal 1, the parallel signal from the equalizer 105 is fed to the carrier extractor 111 through the selector 108. The carrier extractor 111 extracts carriers based on the number of sub-carriers notified from the mobile terminal 2 and feeds the extracted sub-carriers to a parallel-serial converter 117 that converts the received signal to a serial signal. A demodulator 112 demodulates the serial signal fed from the parallel-serial converter 117 under the 16-QAM demodulation formula, and a decoder 113 decodes the demodulated signal under the error-correction-code coding rate ¾. Thus, the decoded data are outputted from the decoder 113.

In summary, the first embodiment operates in the following manner. The control signal including the number of sub-carriers N and the transmission rate Fn determined according to the vehicle speed at that time is notified from the mobile terminal 2 to the stationary terminal 1. After the control signal is acknowledged by the stationary terminal 1, the DATA are transmitted from the mobile terminal 2 to the stationary terminal 1 using the number of sub-carriers and the transmission rate notified. Therefore, the stationary terminal 1 is able to successfully receive and decode the DATA from the mobile terminal 2 even if the mobile station moves at a high speed.

Second Embodiment

Figure 6:
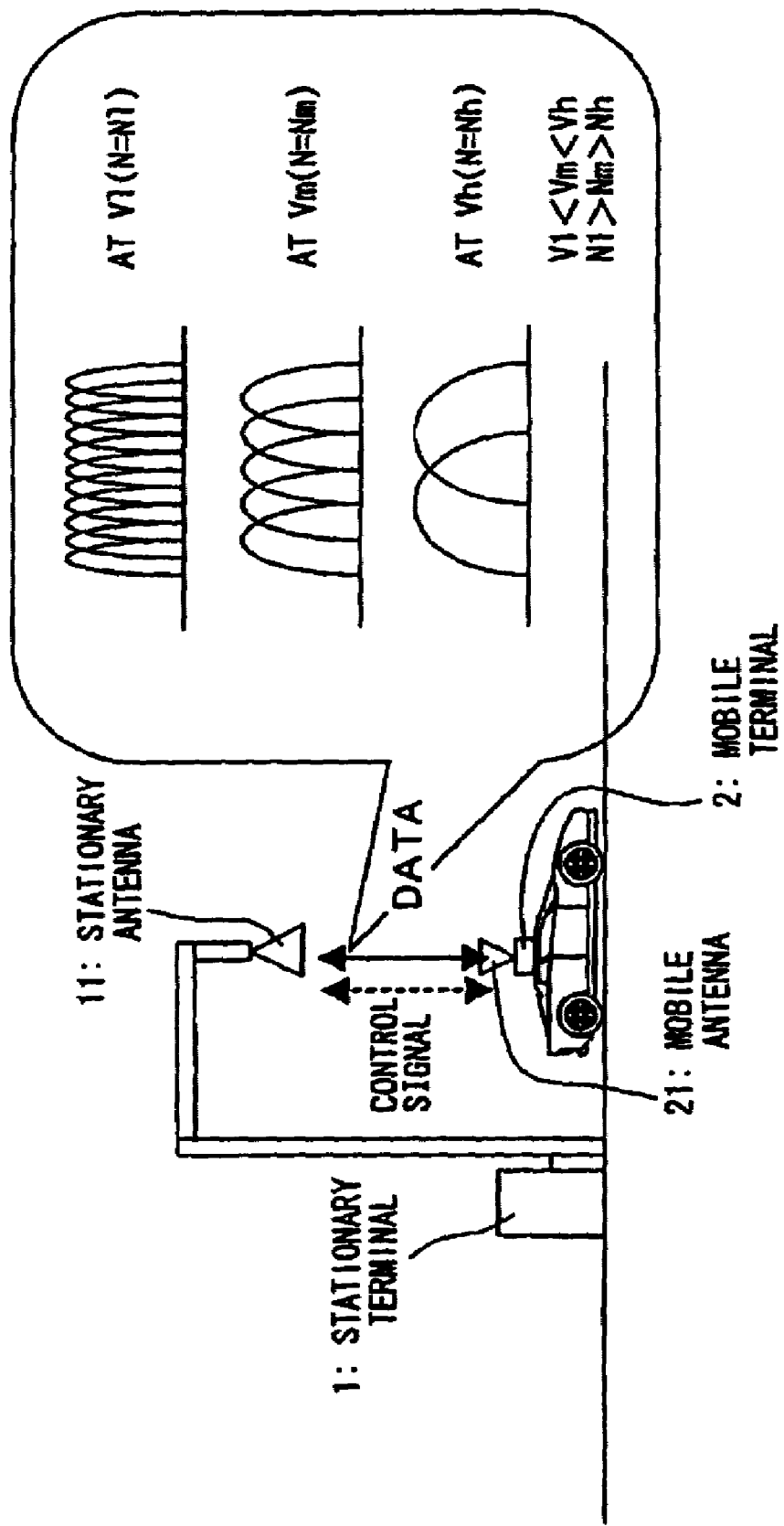
FIG. 6 is a conceptual diagram showing communication between a stationary terminal and a mobile terminal in a second embodiment of the present invention.

A second embodiment of the present invention will be described with reference to FIGS. 6–9. The number of sub-carriers N to be used in the DATA communication is determined according to the vehicle speed in the same manner as in the first embodiment. However, in this embodiment, the transmission rate Fn is fixed to the maximum rate Fn(max) irrespective of the number of sub-carries N. Accordingly, the bandwidth of each sub-carrier is expanded as the number of sub-carriers N becomes less, as shown in FIG. 6. The communication timing in this embodiment is the same as that of the first embodiment shown in FIG. 3.

FIG. 7 shows a structure of a transmitter in the mobile terminal 2, which is almost the same as that of the first embodiment. The controller 201 determines the number of sub-carriers N to be used in transmitting the DATA according to the vehicle speed and feeds the control signal including the determined number of sub-carriers N to the coding circuit 202 to transmit the control signal to the stationary terminal 1. The controller 201 also controls the serial-parallel converter 204, the IFFT-processor 206 and the parallel-serial converter 207 to transmit the DATA based on the number of sub-carriers N determined. For example, the serial-parallel converter 204 converts a serial signal into a 64-symbol parallel signal when N is set to Nl, into a 32-symbol parallel signal when N is set to Nm, and into a 16-symbol parallel signal when N is set to Nh.

Similarly, the IFFT-processor 206 IFFT-processes the parallel signal with 64 points when N=Nl, with 32 points when N=Nm, and with 16 points when N=Nh. The parallel-serial converter 207 converts the 64-symbol parallel signal into a serial signal when N=Nl, the 32-symbol parallel signal into a serial signal when N=Nm, and the 16-symbol parallel signal into a serial signal when N=Nh. In sending the DATA, the error-correction-code coding rate R is set to ¾, and the 16-QAM is used as the sub-carrier modulation formula in this embodiment, too.

FIG. 8 shows a structure of a receiver in a stationary terminal 1. The controller 114 controls the serial-parallel converter 103, the FFT-processor 104, the equalizer 105 and the parallel-serial converter 117, based on the number of sub-carriers notified from the mobile terminal 2. For example, those circuits 103, 104, 105, 117 perform respective functions for the 64-symbol when N=Nl, for the 32-symbol when N=Nm, and for the 16-symbol when N=Nh. The demodulator 112 performs the sub-carrier demodulation under the 16-QAM, and the decoder 113 decodes the data with the error-correction-code coding rate ¾.

In summary, the second embodiment operates in the similar manner as in the first embodiment. A bit-error-rate (BER) can be improved by using the smaller number of sub-carriers and thereby enlarging the bandwidth of the sub-carriers. FIG. 9 shows simulation results of BER relative to the number of sub-carriers when the vehicle moves at 180 km/h. In the case where a guard interval is added to the transmitting signals, the delay time is usually within the guard interval. When the delay time is less than 2,000 nano seconds and is encompassed within the guard interval, a better BER is obtained with 12 sub-carriers than with 24 sub-carriers.

Third Embodiment

Figure 10:
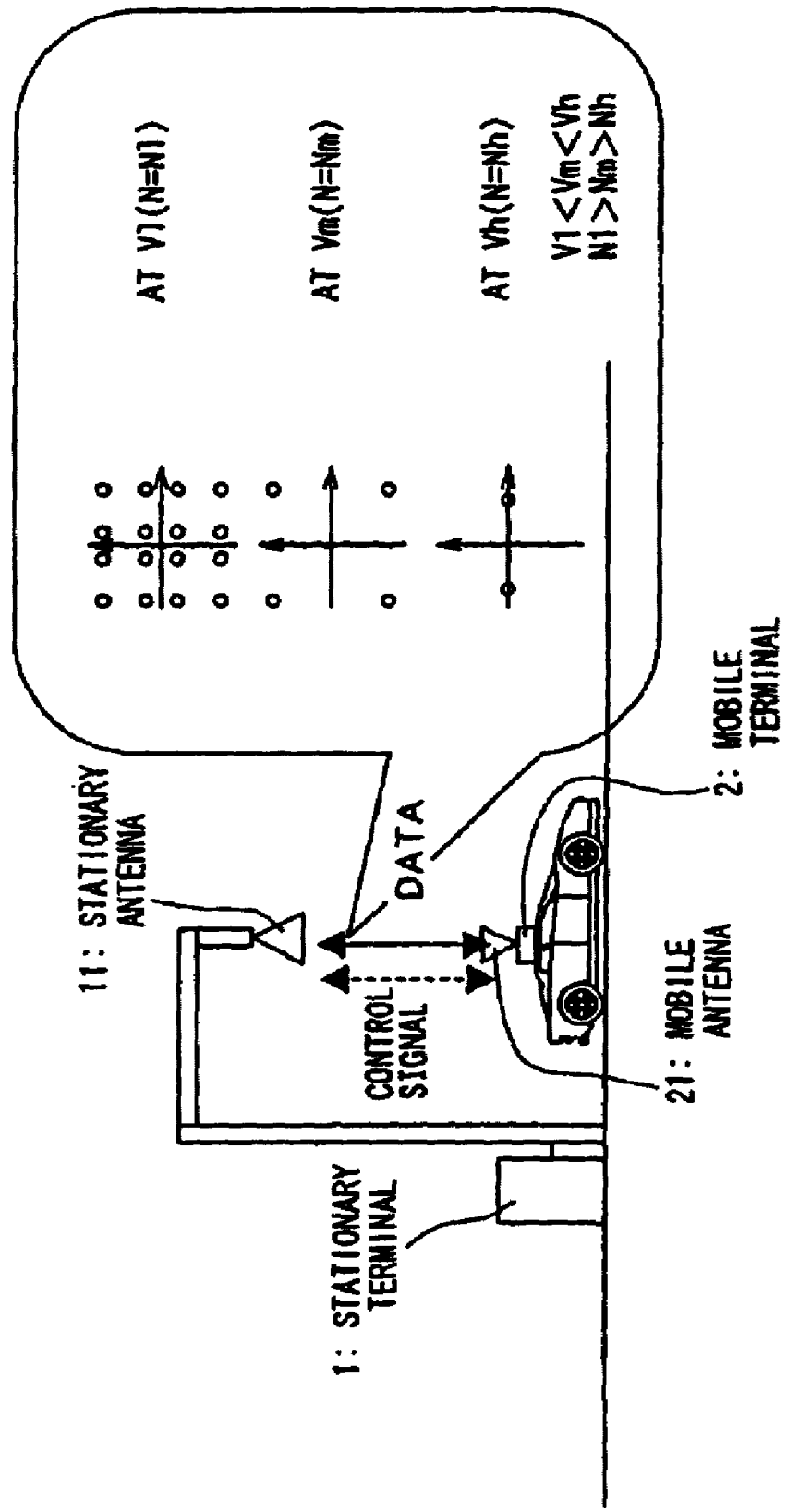
FIG. 10 is a conceptual diagram showing communication between stationary and mobile terminals in a third embodiment of the present invention.

A third embodiment of the present invention will be described with reference to FIGS. 10–13. FIG. 10 shows communication between the stationary terminal 1 and the mobile terminal 2. In this embodiment, the sub-carrier modification formulae are determined according to the vehicle speed. A map showing a relation between the modification formulae and the vehicle speeds (shown in FIG. 11) is stored in the mobile terminal 2. A modification formula 16-QAM is used at a vehicle speed Vl (low speed), a modification formula QPSK at Vm (medium speed) and a modification formula BPSK at Vh (high speed). Robustness against error (also referred to as error-robustness) of the BPSK is the highest, that of QPSK is medium and that of 16-QAM is the lowest. In other words, a modulation formula having a higher error-robustness is used as the vehicle speed increases. The transmission rate Fn is set to Fn(max) for the 16-QAM, to Fn(max)/2 for the QPSK, and to Fn(max)/4 for the BPSK. That is, the transmission rate Fn is decreased as the vehicle speed increases. Communication between the mobile terminal 2 and the stationary terminal 1 is performed under the timing shown in FIG. 3.

Figure 12:
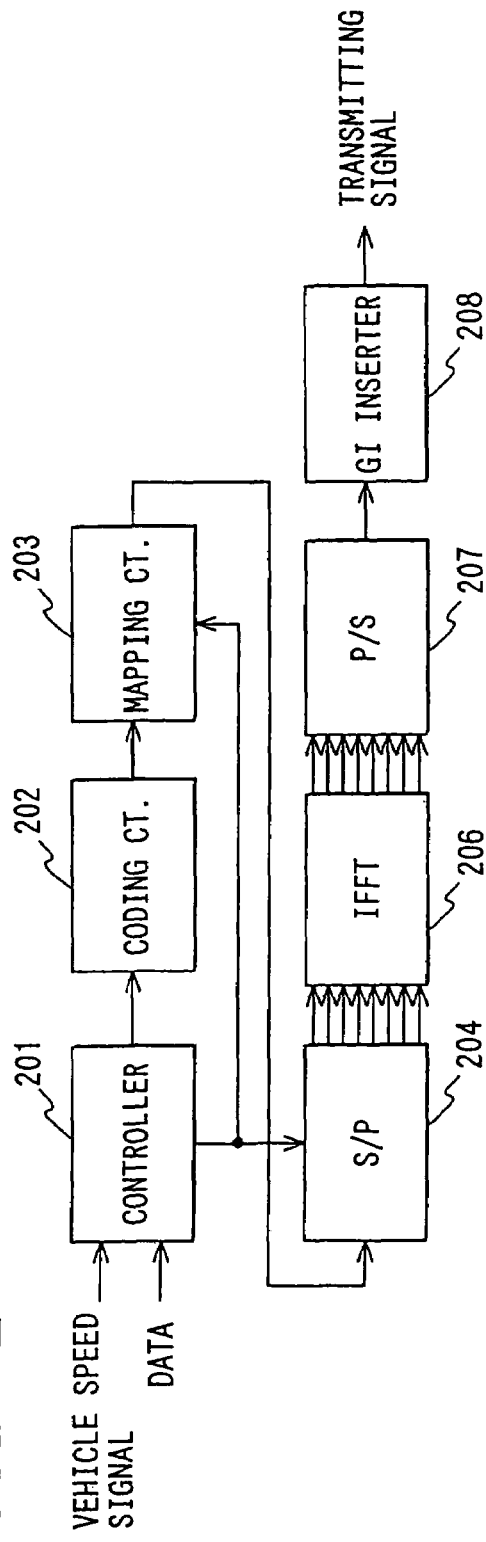
FIG. 12 is a block diagram showing a structure of a transmitter in a mobile terminal used in the third embodiment.

FIG. 12 shows a structure of a transmitter in the mobile terminal 2, which is similar to that of the transmitter used in the first embodiment except the following points. The controller 201 determines the modulation formula to be used and the transmission rate corresponding to the modulation formula based on the vehicle speed. The control signal including the information regarding the determined modulation formula and the transmission rate is fed from the controller 201 to the coding circuit 202, so that the control signal is transmitted to the stationary terminal 1. In transmitting the DATA from the mobile terminal 2 to the stationary terminal 1 using the determined modulation formula and the transmission rate, the controller 201 controls the coding circuit 202 and the mapping circuit 203.

The mapping circuit 203 is structured to modulate sub-carriers under either one of the modulation formulae, 16-QAM, QPSK or BPSK. The mapping circuit 203 performs the modulation under the modulation formula instructed from the controller 201. The number of sub-carriers N and the error-correction-code coding rate R to be used in the DATA transmission are fixed to Nl and $3/4$, respectively.

FIG. 13 shows a receiver in the stationary terminal 1, which is similar to that used in the first embodiment except the following points. The controller 114 controls the demodulator 112 so that the received DATA signal is demodulated based on the modulation formula notified from the mobile terminal 2. The demodulator 112 is structured to demodulate the DATA signal based on either one of the modulation formulae, 16-QAM, QPSK or BPSK. The demodulator 112 performs the demodulation based on the modulation formula instructed from the controller 114 and under the error-correction-code coding rate $3/4$.

In summary, the third embodiment operates in the following manner. The sub-carrier modulation formula to be used is determined according to the vehicle speed and is notified from the mobile terminal 2 to the stationary terminal 1. The stationary terminal 1 demodulates the received DATA signal based on the notified modulation formula. Since the modulation formula having a higher error-robustness is used when the vehicle speed is high, the communication quality is not highly damaged when the Doppler shift occurs at a high vehicle speed.

Fourth Embodiment

A fourth embodiment of the present invention will be described with reference to FIGS. 14–17. FIG. 14 shows communication between the stationary terminal 1 and the mobile terminal 2. In this embodiment, the error-correction-code coding rates R are determined according to the vehicle speed. A map showing a relation between the error-correction-code coding rates R and the vehicle speeds (shown in FIG. 15) is stored in the mobile terminal 2. A coding rate $3/4$ is used at a vehicle speed Vl (low speed), a coding rate $9/16$ at Vm (medium speed) and a coding rate $1/2$ at Vh (high speed). The coding rate R denotes ability of correcting errors in data being mapped in respective sub-carriers (referred to as error-correction ability). The error-correction ability of the coding rate $1/2$ is the highest, that of the coding rate $9/16$ is medium and that of the coding rate $3/4$ is the lowest. In other words, a coding rate R having a higher error-correction ability is used as the vehicle speed increases. The transmission rate Fn is set to Fn(max) for the coding rate $3/4$, to $(3/4) \times$Fn(max) for the coding rate $9/16$, and to $(2/3) \times$Fn(max) for the coding rate $1/2$. That is, the transmission rate Fn is decreased as the vehicle speed increases. Communication between the mobile terminal 2 and the stationary terminal 1 is performed under the timing shown in FIG. 3.

Figure 16:
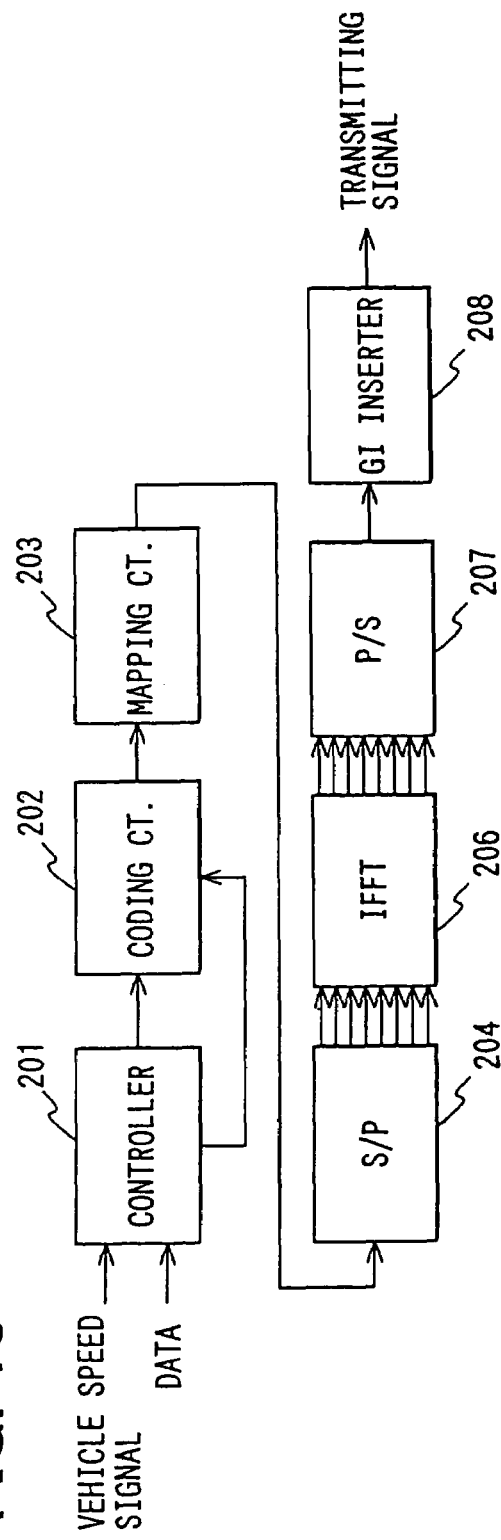
FIG. 16 is a block diagram showing a structure of a transmitter in a mobile terminal used in the fourth embodiment.

FIG. 16 shows a structure of a transmitter in the mobile terminal 2, which is similar to that of the transmitter used in the first embodiment except the following points. The controller 201 determines the error-correction-coding rate R to be used and the transmission rate Fn corresponding to the coding rate R based on the vehicle speed. The control signal including the information regarding the determined coding rate R and the transmission rate Fn is fed from the controller 201 to the coding circuit 202, so that the control signal is transmitted to the stationary terminal 1. In transmitting the DATA from the mobile terminal 2 to the stationary terminal 1 using the determined coding rate and the transmission rate, the controller 201 controls the coding circuit 202.

The coding circuit 202 is structured to codify the DATA to be transmitted under either one of coding rates $3/4$, $9/16$ or $1/2$ and under the transmission rates corresponding to the respective coding rates. The coding circuit 202 codifies the DATA based on the instructions fed from the controller 201. The number of sub-carriers N and the modulation formula to be used in the DATA transmission are fixed to Nl and the 16-QAM, respectively.

FIG. 17 shows a receiver in the stationary terminal 1, which is similar to that used in the first embodiment except the following points. The controller 114 controls the decoder 113 so that the received DATA signal is decoded under the error-correction-code coding rate and the transmission rate, both notified from the mobile terminal 2. The demodulator 112 demodulates the received sub-carriers based on the modulation formula 16-QAM.

In summary, the fourth embodiment operates in the following manner. The error-correction-code coding rate R and the transmission rate Fn to be used in the DATA transmission are determined according to the vehicle speed and are notified from the mobile terminal 2 to the stationary terminal 1. The stationary terminal 1 decodes the received DATA signal based on the notified coding rate and the transmission rate. Since the coding rate R having a higher error-correction ability is used when the vehicle speed becomes higher, the communication quality is not much damaged if the Doppler shift occurs at a high vehicle speed.

Fifth Embodiment

A fifth embodiment of the present invention will be described with reference to FIGS. 18 and 19. FIG. 18 shows a communication system of this embodiment. The mobile terminal 2 includes a wireless communication device 4 such as a mobile phone that is able to perform quality communication when a vehicle is being driven. The same control signal as described in the foregoing embodiments (the first through the fourth embodiments) is transmitted from the wireless communication device 4 when the mobile terminal 2 enters an area in which the mobile terminal 2 is communicable with the stationary terminal 1. Whether the mobile terminal 2 enters the communicable area or not is detected, for example, by a GPS receiver mounted on the mobile terminal 2. The control signal is automatically transmitted from the wireless communication device 4 based on instructions from the controller 201 (shown in FIGS. 4, 7, 12 and 16). The control signal transmitted from the wireless communication device 4 is received by a base terminal 3 and is sent to the stationary terminal 1 through an exchanger 5.

Figure 19:
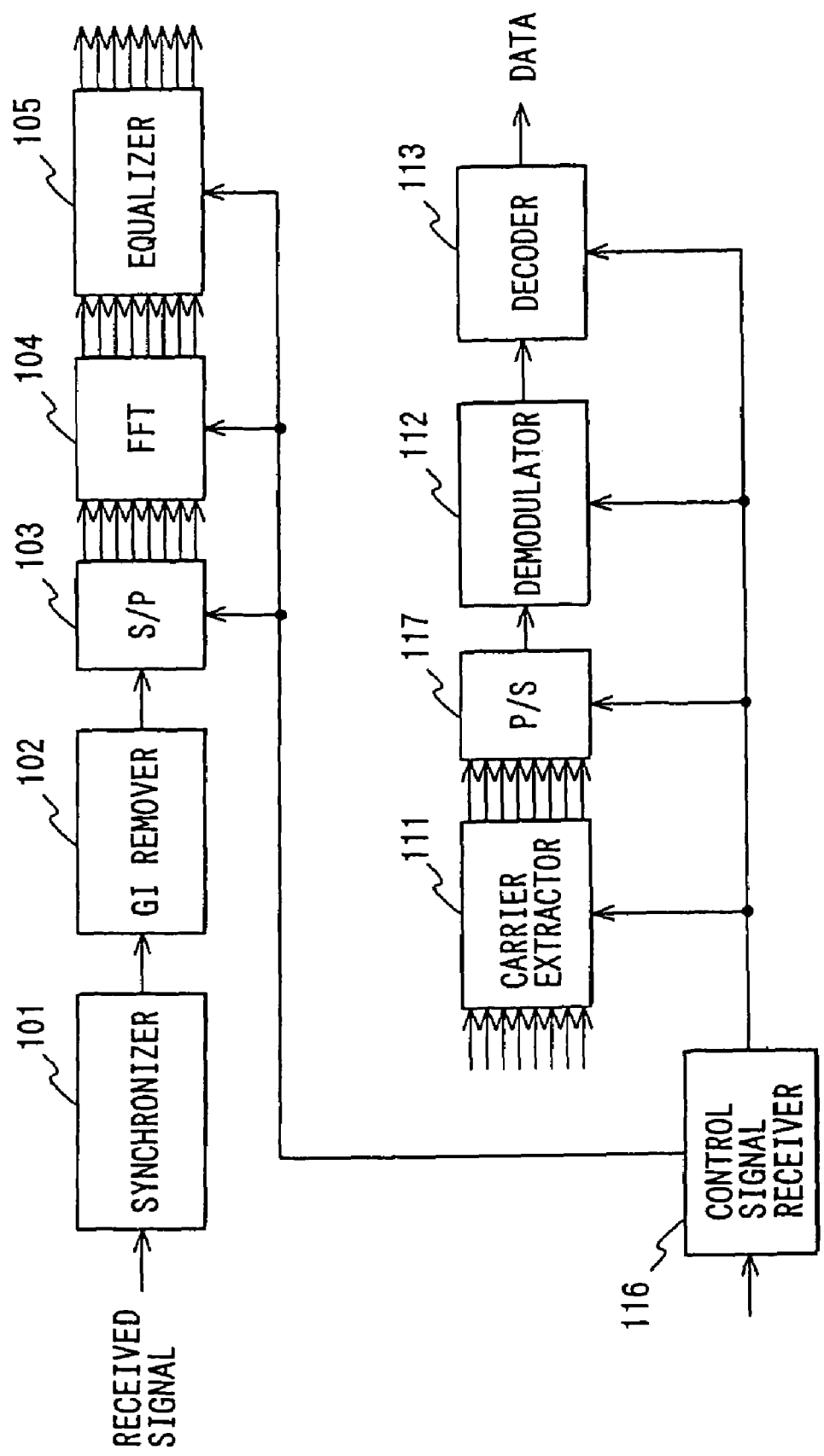
FIG. 19 is a block diagram showing a structure of a receiver in a stationary terminal used in the fifth embodiment.

FIG. 19 shows a receiver in the stationary terminal 1. The control signal sent from the mobile terminal 2 to the stationary terminal 1 is received by a control signal receiver 116. Based on the control signal, the DATA signal received by the stationary terminal 1 is processed in the same manner as in the foregoing embodiments. That is, when the control signal including the number of sub-carriers N and the transmission rate Fn is sent as in the first embodiment, the carrier extractor 111 and the parallel-serial converter 117 are controlled based on the N and Fn. When the control signal including the number of sub-carriers N is sent as in the second embodiment, the serial-parallel converter 103, the FFT-processor 104, the equalizer 105 and the parallel-serial converter 117 are controlled based on the N. When the control signal including the sub-carrier modulation formula and the transmission rate Fn is sent, the demodulator 112 is controlled based on the modulation formula and the Fn. When the control signal including the error-correction-code coding rate R and the transmission rate Fn is sent as in the fourth embodiment, the decoder 113 is controlled based on the R and Fn.

Sixth Embodiment

Figure 20:
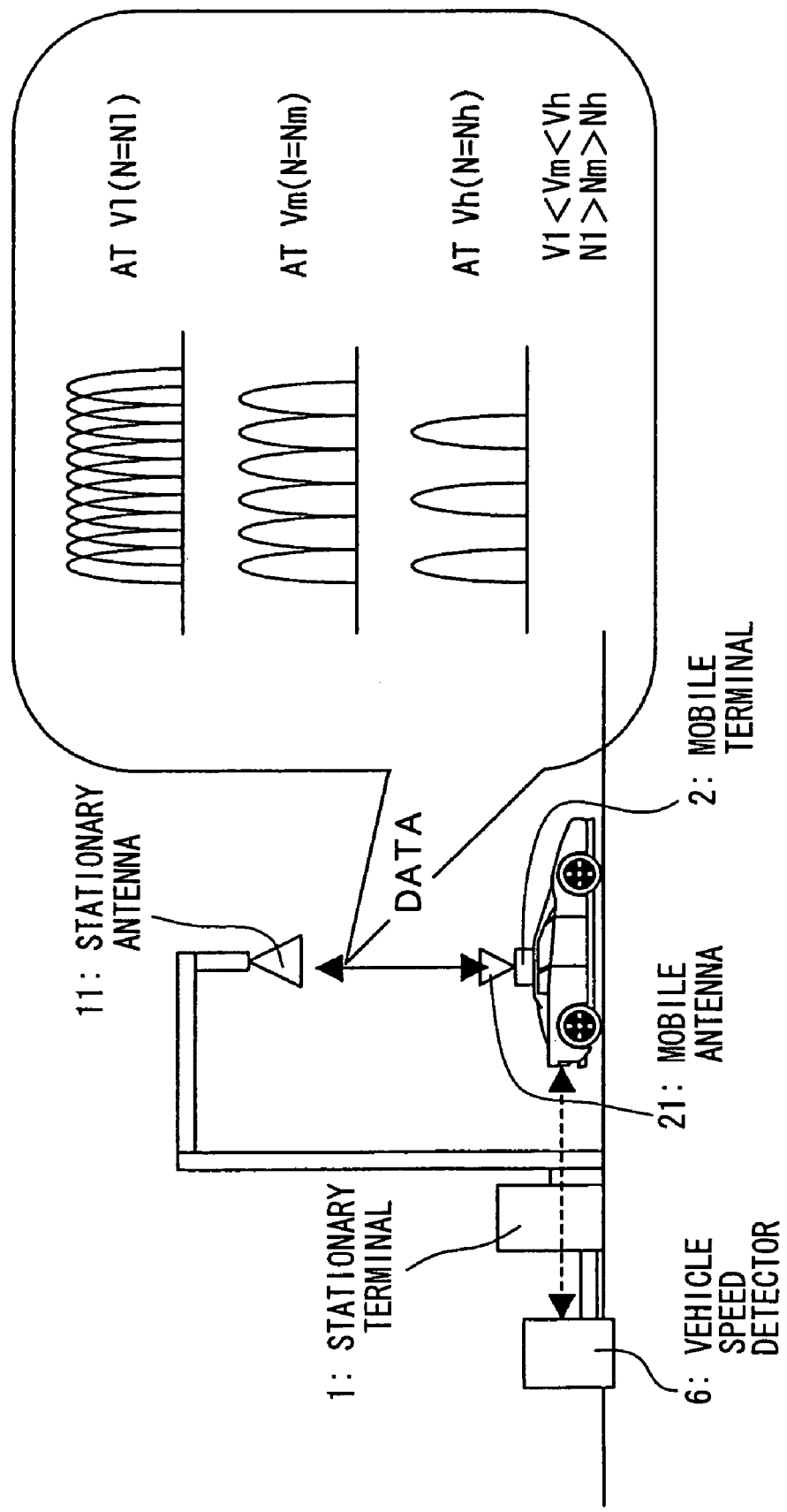
FIG. 20 is a conceptual diagram showing communication between stationary and mobile terminals in a sixth embodiment of the present invention.

A sixth embodiment of the present invention will be described with reference to FIG. 20. In the foregoing embodiments (the first through the fourth embodiments), the information included in the control signal such as the number of sub-carriers N, the communication rate Fn, the modulation formula and the coding rate R are all determined in the mobile terminal 2 based on the signal from the vehicle speed sensor mounted on the vehicle. The control signal including such information is sent from the mobile terminal 2 to the stationary terminal 1 before the DATA transmission. In this embodiment, the vehicle speed is detected by a vehicle speed detector 6 positioned in the vicinity of the stationary terminal 1. The vehicle speed may be detected, e.g., by means of a radar. The stationary terminal 1 determines the information, such as N, Fn, R and the modulation formula, based on the vehicle speed detected by the vehicle speed detector 6. The maps (shown in FIGS. 2, 11, and 15) required for determining such information based on the vehicle speed are stored in the stationary terminal 1.

In the sixth embodiment, therefore, the DATA transmitted from the mobile terminal 2 to the stationary terminal 1 can be processed without receiving the control signal from the mobile station 2. The DATA are processed in the same manner as described in either one of the foregoing embodiments (the first through the fourth embodiments).

Seventh Embodiment

Figure 21:
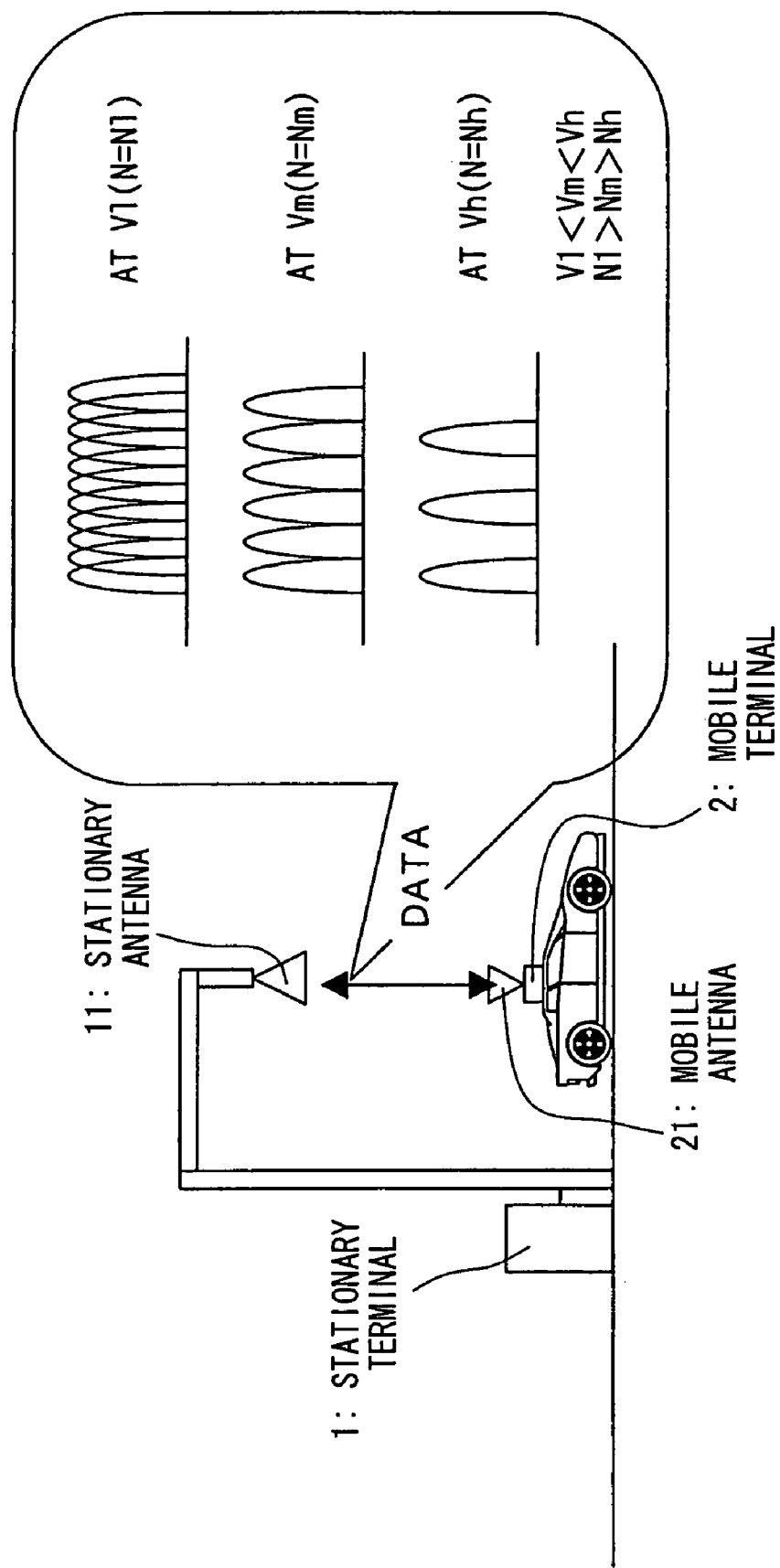
FIG. 21 is a conceptual diagram showing communication between stationary and mobile terminals in a seventh embodiment of the present invention.

A seventh embodiment of the present invention will be described with reference to FIGS. 21–25. FIG. 21 shows a communication system of the seventh embodiment. In the first embodiment described above, the number of sub-carriers N to be used in the DATA transmission is determined based on the vehicle speed and is notified to the stationary terminal 1 before the DATA transmission. In this embodiment, however, the number of sub-carriers used in the DATA transmission is determined by the stationary terminal 1 without receiving such information from the mobile terminal 2.

Figure 22A:
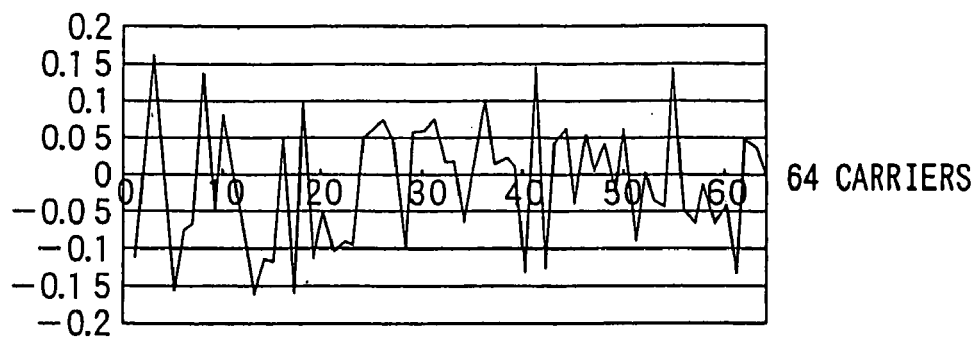
FIGS. 22A–22D are graphs showing waveforms of OFDM symbols outputted from a transmitter in a mobile terminal.
Figure 22B:
Figure 22C:
Figure 22D:
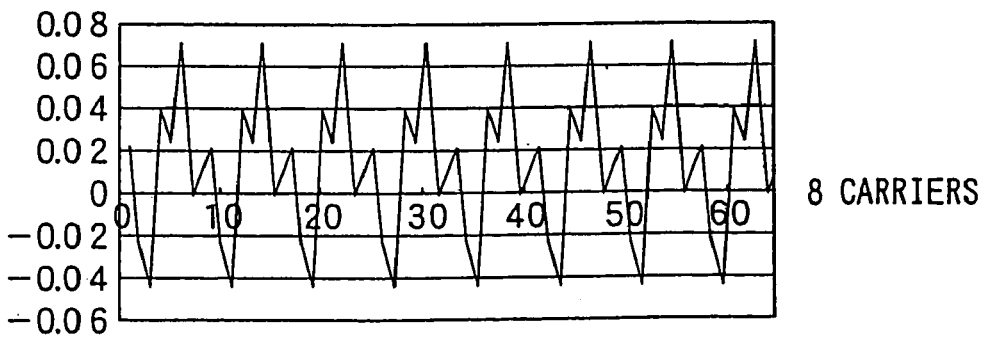
Figure 23:
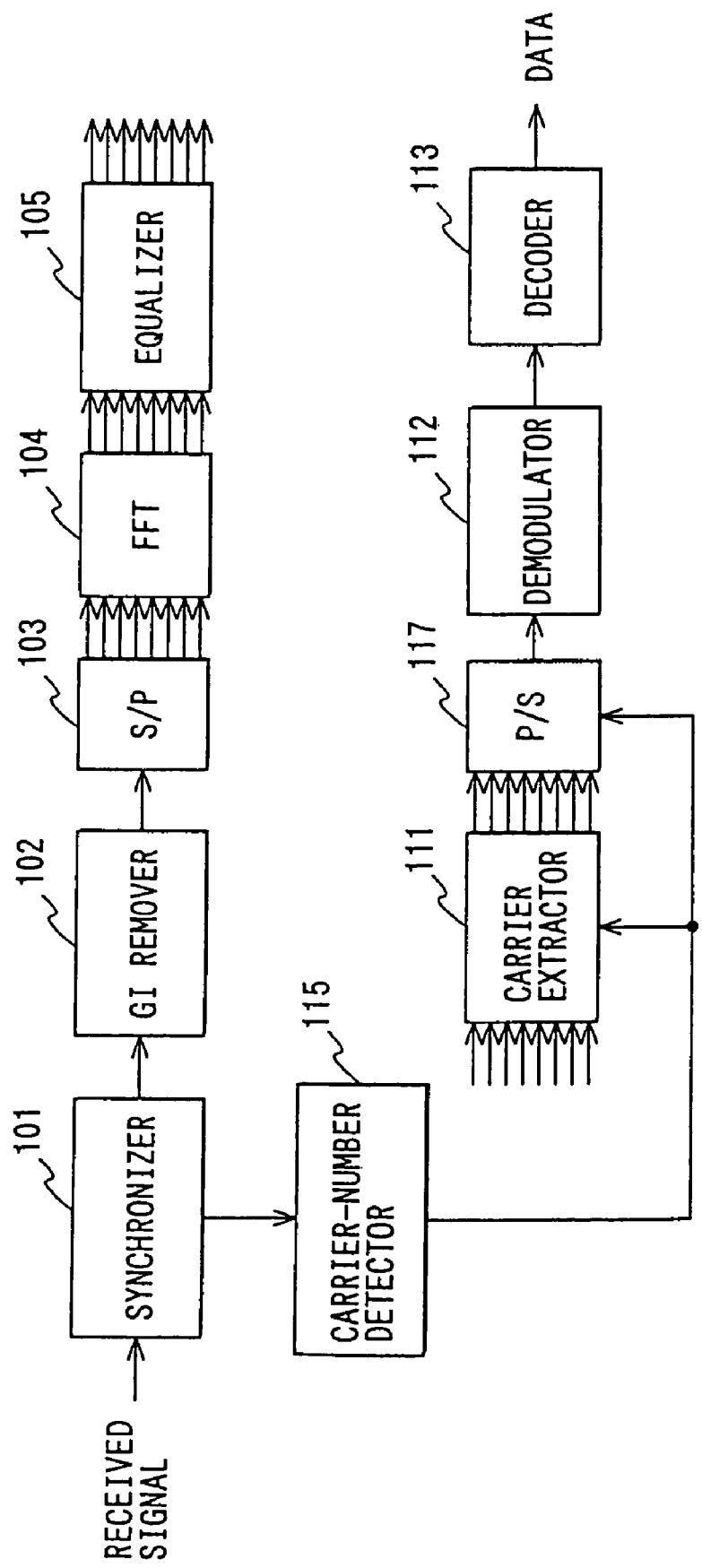
FIG. 23 is a block diagram showing a structure of a receiver in a stationary terminal used in the seventh embodiment of the present invention.

FIGS. 22A–22D show waveforms of the OFDM symbol outputted from the parallel-serial converter 207. The number of sub-carriers N is: 64 in FIG. 22A; 32 in FIG. 22B; 16 in FIG. 22C; and 8 in FIG. 22D. In the case N is 32, the same waveform is repeated twice as seen in FIG. 22B; in the case N is 16, the same waveform is repeated four times as seen in FIG. 22C; and in the case N is 8, the same waveform is repeated eight times as seen in FIG. 22D. It is possible, therefore, to determine the number of sub-carriers N at the stationary terminal 1, based on the periodical repetition of the waveform. FIG. 23 shows a receiver in the stationary terminal 1. A carrier-number detector 115 is provided in the receiver, and the carrier-extractor 111 is controlled based on the detected number of sub-carriers N in the same manner as in the first embodiment.

Figure 24:
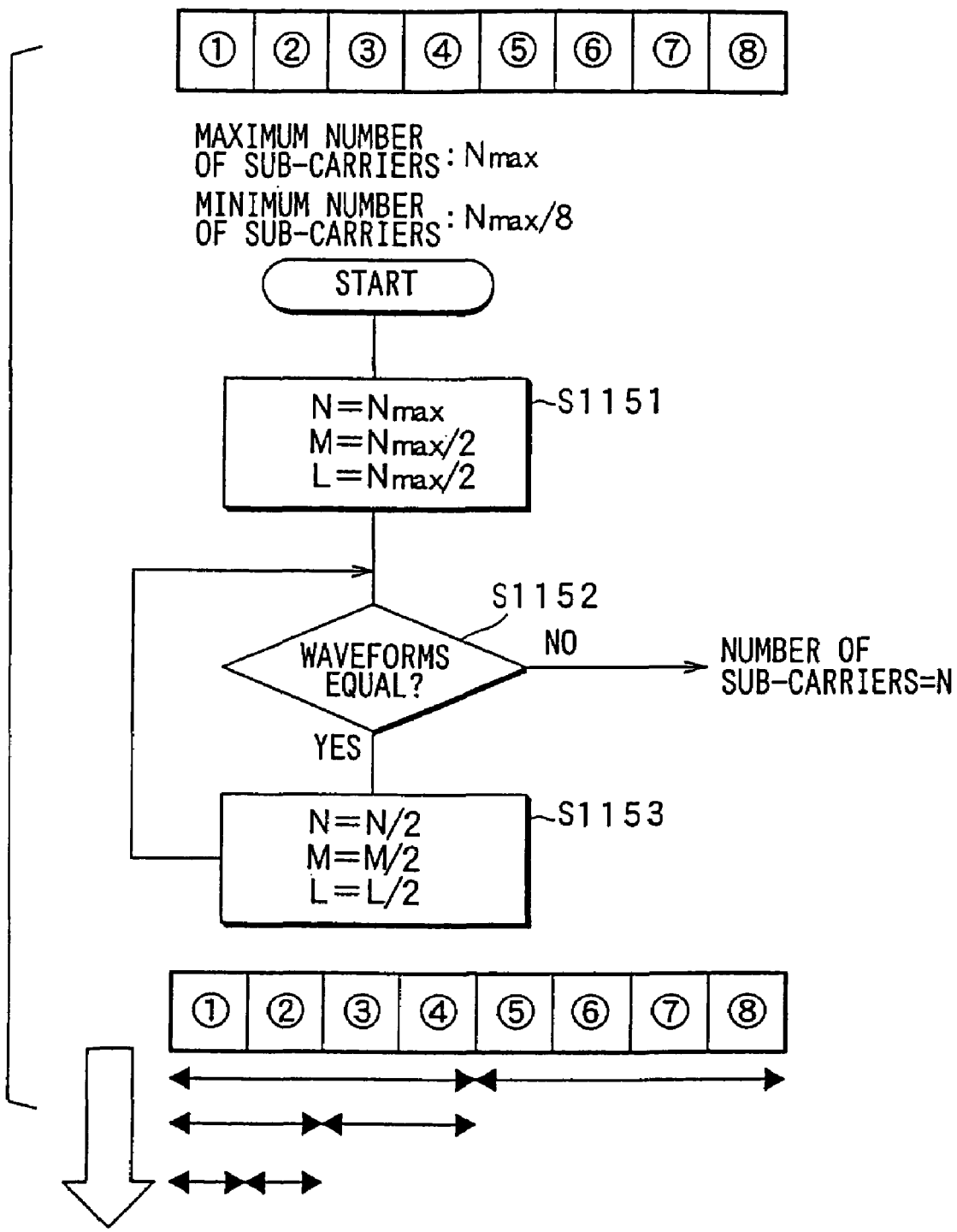
FIG. 24 is a flowchart showing a process for estimating the number of sub-carries in an OFDM symbol unit.

FIG. 24 shows a process for detecting the number of sub-carriers N, which is performed in the carrier-number detector 115. In this embodiment, the maximum number of sub-carriers is set to Nmax and the minimum number of sub-carriers is set to Nmin which is equal to Nmax/8. A waveform within an OFDM symbol unit time in a received signal is divided into 8 sections, ①–⑧. Upon starting the process, at step S1151, the following setting is made: N=Nmax, M=Nmax/2, L=Nmax/2. M and L respectively denote a period in which the waveforms are compared. At step S1152, a waveform in M (a period from ① to ④ in this case) is compared with a waveform in L (a period from ⑤ to ⑧ in this case), and whether both waveforms are equal or not is determined. For example, as explained later, both waveforms are presumed equal if a correlation value between both waveforms exceeds a predetermined threshold level. If it is determined that both waveforms in M and L are not equal, the number of sub-carriers is determined as N at that time (=64).

On the other hand, if it is determined that both waveforms are equal at step S1152, the process proceeds to step S1153. Since there is a possibility in this case that the number of sub-carriers is smaller than 64, N, M, and L are further divided into ½, respectively, at step S1153. Then, the process returns to step S1152 to compare a waveform in M (a period from ① to ② in this case) with a waveform in L (a period from ③ to ④ in this case). If it is determined that both waveforms are not equal, the number of sub-carriers is determined as N at that time (=32). If it is determined that both waveforms are equal, N, M, and L are further divided into ½, and the foregoing steps are repeated. Thus, the number of sub-carriers is detected based on the periodical repetition of the waveforms.

Figure 25:
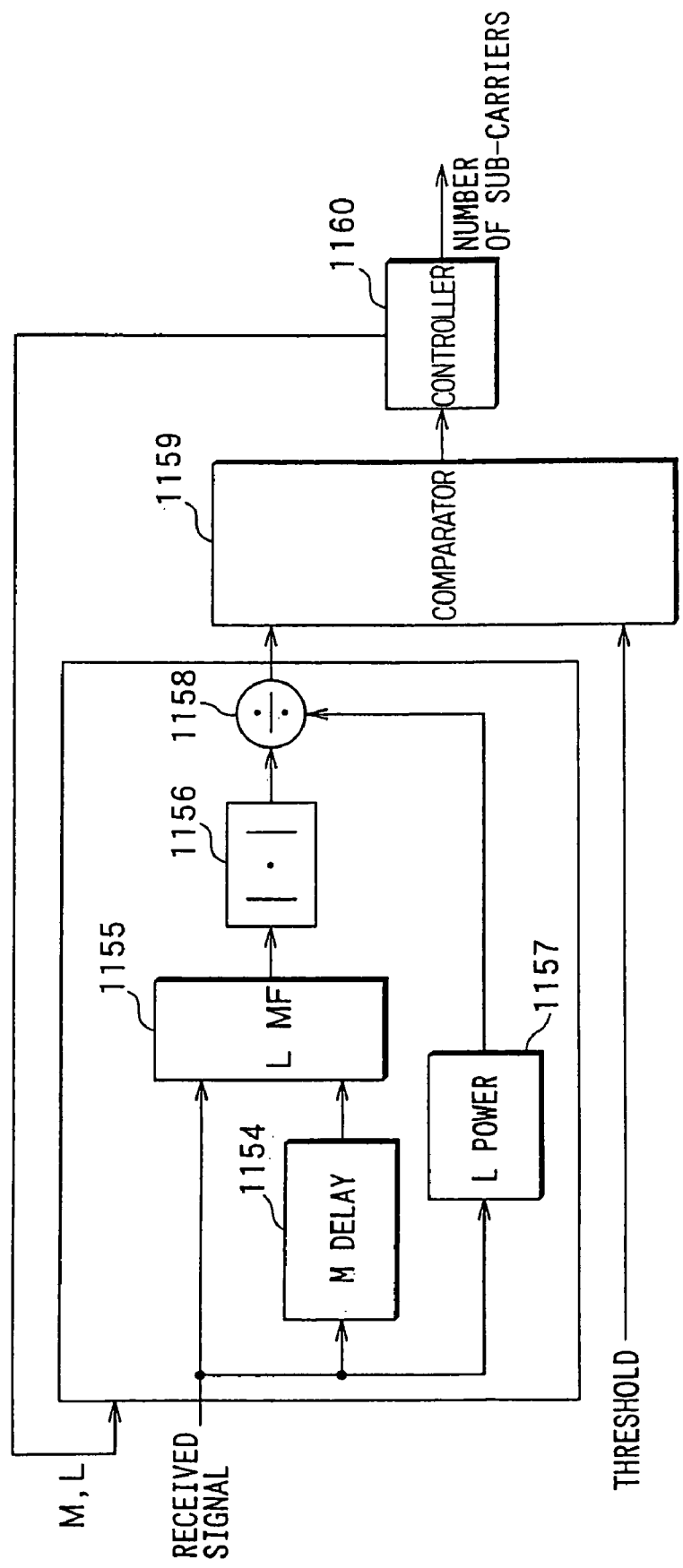
FIG. 25 is a block diagram showing a structure of a circuit for estimating the number of sub-carriers.

FIG. 25 shows an example of the carrier-number detector 115 in a hardware structure. A Correlation value between signals in period M delayed in a delay circuit 1154 and signals in period L is detected in a matched filter 1155. An absolute value circuit 1156 derives an absolute value of the correlation value. Power in period L detected by a power detector 1157 is fed to a divider 1158. The divider 1158 divides the correlation absolute value with the power in period L to normalize the correlation absolute value. The normalized value is compared with a predetermined threshold value in a comparator 1159 to determine whether there is a correlation between signals in period M and L. If the correlation is found, the periods M and L are further divided into ½, respectively, in a controller 1160, and the foregoing process is repeated. Thus, the number of sub-carriers is determined in a similar manner described in reference to FIG. 24.

The number of sub-carriers can be determined at the stationary terminal 1 in the manner described above without receiving such information from the mobile terminal 2. The DATA signals transmitted from the mobile terminal 2 are properly processed at the stationary terminal 1, based on the detected number of sub-carriers.

Other Embodiments

Figure 26:
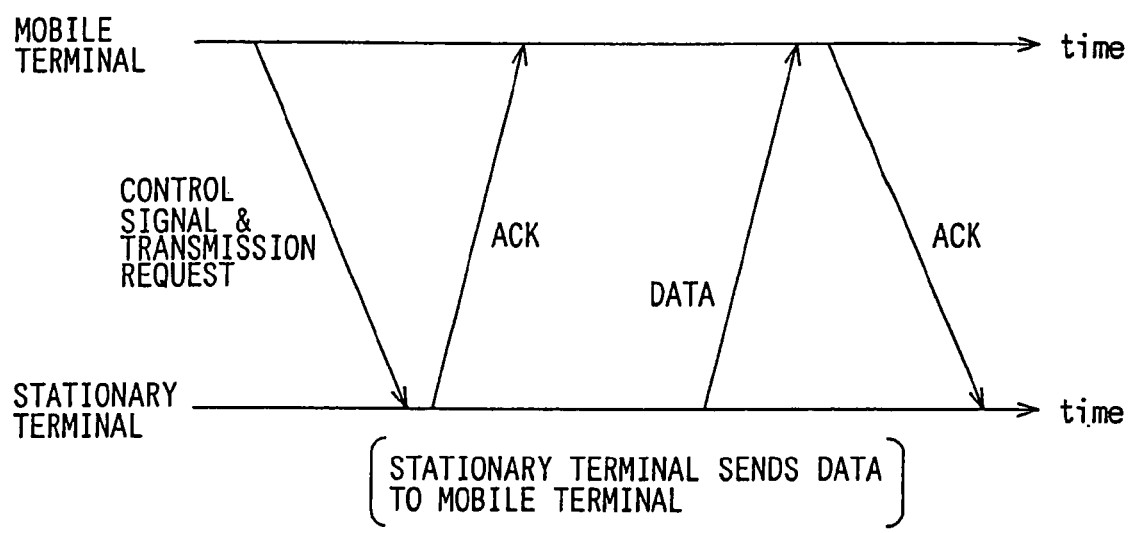
FIG. 26 is a diagram showing communication timing between stationary and mobile terminals.

In the foregoing embodiments, the DATA are transmitted from the mobile terminal 2 to the stationary terminal 1. The DATA may be sent from the stationary terminal 1 to the mobile terminal 2, or may be sent from both terminals. In the case the DATA are transmitted from the stationary terminal 1 to the mobile terminal 2, the communication between two terminals is performed under the timing shown in FIG. 26. First, the mobile terminal 2 sends a control signal that includes the number of sub-carriers N to be used in sending the DATA from the stationary terminal 1 and requests the DATA transmission. The number of sub-carriers N is determined according to the moving speed of the mobile terminal 2 in the same manner as in the foregoing embodiments. The control signal may also includes the modulation formula, the transmission rate Fn or the error-correction-code coding rate R to be used in the DATA transmission. Then, an ACK signal acknowledging the receipt of the control signal is sent from the stationary terminal 1 to the mobile terminal 2. Then, the DATA are transmitted from the stationary terminal 1, and the receipt of the DATA is acknowledged by an ACK signal from the mobile terminal 2.

In the above case where the DATA are transmitted from the stationary terminal 1 to the mobile terminal 2, the substantially same transmitter as that used in the mobile terminal 2 in the foregoing embodiments may be used in the stationary terminal 1. Similarly, the substantially same receiver as that used in the stationary terminal 1 in the foregoing embodiments may be used in the mobile terminal 2. The controllers 201, 114 for the transmitter and the receiver have to be somewhat modified to match the situation.

The DATA are transmitted from the mobile terminal 2 to the stationary terminal 1, based on the number of sub-carriers N and the transmission rate Fn, both determined according to the vehicle speed, in the first embodiment described above. In the second embodiment, the DATA transmission is performed based on N. In the third embodiment, the DATA transmission is performed based on the determined modulation formula and the transmission rate Fn. In the fourth embodiment, the DATA transmission is performed based on the error-correction-code coding rate R and the transmission rate Fn determined according to the vehicle speed. Two or more such factors, among N, Fn, modulation formula and R, may be arbitrarily combined according to particular needs in a communication system. The present invention may be further modified as long as adverse effects of the Doppler shift due to moving speed are avoided or alleviated.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A communication system in which communication is performed between a stationary terminal and a mobile terminal under an Orthogonal Frequency Division Multiplexing (OFDM) system, the communication system comprising:
    a transmitter in the mobile terminal for transmitting a control signal and a data signal; and
    a receiver in the stationary terminal for receiving the control signal and the data signal transmitted from the mobile terminal, wherein:
    the control signal includes a signal indicating a number of sub-carriers used in transmitting the data signal; and
    the number of sub-carriers is determined according to a moving speed of the mobile terminal so that the number of the sub-carriers is reduced in accordance with increase of the moving speed.

2. The communication system as in claim 1, wherein:
    a transmission rate of the data signal is reduced in accordance with increase of the moving speed.

3. The communication system as in claim 2, wherein the mobile terminal comprising:
    a transmitter-receiver for communicating with the stationary terminal;
    a speed sensor for detecting the moving speed of the mobile terminal; and
    a controller for determining the number of sub-carriers and the transmission rate according to the detected moving speed, for instructing the transmitter-receiver to notify the number of sub-carriers and the transmission rate to the stationary terminal, and for controlling the transmitter-receiver based on the number of sub-carriers and the transmission rate.

4. The communication system as in claim 3, wherein the stationary terminal comprising:
    transmitter-receiver means for performing communication with the mobile terminal; and
    means for controlling the transmitter-receiver means based on the number of sub-carriers and the transmission rate notified from the mobile terminal.

5. The communication system as in claim 1, wherein:
    a transmission rate of the data signal is kept constant irrespective of the moving speed.

6. The communication system as in claim 5, wherein the mobile terminal comprising:
    a transmitter-receiver for communicating with the stationary terminal;
    a speed sensor for detecting the moving speed of the mobile terminal; and
    a controller for determining the number of sub-carriers according to the detected moving speed while maintaining the transmission rate constant, for instructing the transmitter-receiver to notify the number of sub-carriers and the transmission rate to the stationary terminal, and for controlling the transmitter-receiver based on the number of sub-carriers and the transmission rate.

7. The communication system as in claim 6, wherein the stationary terminal comprising:
    transmitter-receiver means for performing communication with the mobile terminal; and
    means for controlling the transmitter-receiver means based on the number of sub-carriers notified from the mobile terminal.

8. The communication system as in claim 1, wherein the mobile terminal comprising:

a transmitter-receiver for communicating with the stationary terminal;

a speed sensor for detecting the moving speed of the mobile terminal; and a controller for determining the number of sub-carriers according to the detected moving speed, for instructing the transmitter-receiver to notify the number of sub-carriers to the stationary terminal, and for controlling the transmitter-receiver based on the number of sub-carriers.

9. The communication system as in claim 8, wherein the stationary terminal comprising:

transmitter-receiver means for performing communication with the mobile terminal; and means for controlling the transmitter-receiver means based on the number of sub-carriers notified from the mobile terminal.

10. The communication system as in claim 1, wherein the mobile terminal comprising:

a transmitter-receiver for communicating with the stationary terminal;

a speed sensor for detecting the moving speed of the mobile terminal; and a controller for determining the number of sub-carriers according to the detected moving speed, and for controlling the transmitter-receiver based on the number of sub-carriers.

11. The communication system as in claim 10, wherein the stationary terminal comprising:

transmitter-receiver means for performing communication with the mobile terminal:

means for determining the number of sub-carriers based on the data signal received from the mobile terminal; and means for controlling the transmitter-receiver means based on the number of sub-carriers determined by the determining means.

12. The mobile terminal as in any one of claims 8, 3, or 6, wherein:

the mobile terminal further includes a wireless communication device for making notification to the stationary terminal in place of the transmitter-receiver according to the instruction from the controller.

\* \* \* \* \*